(12) United States Patent    (10) Patent No.: US 8,156,339 B2
Hori    (45) Date of Patent: *Apr. 10, 2012

(54) METHOD FOR TRANSMISSION/RECEPTION OF CONTENTS USAGE RIGHT INFORMATION IN ENCRYPTED FORM, AND DEVICE THEREOF

(75) Inventor: Yoshihiro Hori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1291 days.

This patent is subject to a terminal disclaimer.

(21) Appl. No.: 11/185,973

(22) Filed: Jul. 21, 2005

(65) Prior Publication Data

US 2006/0018473 A1    Jan. 26, 2006

(30) Foreign Application Priority Data

Jul. 21, 2004  (JP) ................................. 2004-213673
Sep. 30, 2004  (JP) ................................. 2004-289277

(51) Int. Cl.
    H04L 29/06    (2006.01)
(52) U.S. Cl. ........................... 713/175; 380/255; 726/27
(58) Field of Classification Search ................ 380/255; 726/26, 27, 28, 29, 30; 713/175
    See application file for complete search history.

(56) References Cited

U.S. PATENT DOCUMENTS

| 4,292,580 | A | * | 9/1981 | Ott et al. ........................ 323/212 |
| 5,920,630 | A | * | 7/1999 | Wertheimer et al. .......... 380/286 |
| 5,995,625 | A | * | 11/1999 | Sudia et al. ....................... 705/51 |
| 6,711,263 | B1 | * | 3/2004 | Nordenstam et al. .......... 380/282 |
| 6,711,679 | B1 | * | 3/2004 | Guski et al. .................... 713/156 |
| 6,823,454 | B1 | * | 11/2004 | Hind et al. ...................... 713/168 |
| 6,950,941 | B1 | * | 9/2005 | Lee et al. ........................ 713/193 |
| 7,017,189 | B1 | * | 3/2006 | DeMello et al. ................ 726/26 |
| 7,096,363 | B2 | * | 8/2006 | Kon et al. ....................... 713/176 |
| 7,123,721 | B2 | * | 10/2006 | Panjwani et al. ............. 380/270 |
| 7,181,629 | B1 | * | 2/2007 | Hatanaka et al. ............. 713/194 |
| 7,366,905 | B2 | * | 4/2008 | Paatero ........................ 713/175 |
| 7,383,205 | B1 | * | 6/2008 | Peinado et al. ................ 705/59 |
| 7,461,251 | B2 | * | 12/2008 | Oishi ............................ 713/162 |

(Continued)

FOREIGN PATENT DOCUMENTS

JP    2004-133654 A    4/2004

Primary Examiner — David Garcia Cervetti
(74) Attorney, Agent, or Firm — McDermott Will & Emery LLP

(57) ABSTRACT

A license-data transmitter (in a case of recording, a recording device 100 serves as a license-data transmitter, and in a case of readout, a storage device 200 serves as a license-data transmitter) verifies a certificate C[KPdx] (the license-data receiver and the license-data transmitter will be represented by "x" and "y", respectively) of a license-data receiver (in a case of recording, a storage device 200 serves as a license-data receiver, and in a case of readout, a reproducing device 300 serves as a license-data receiver), following which the license-data transmitter transmits a certificate C[KPdy] thereof to the license-data receiver in the form of challenge information E(KPdx, Kcy)//C[KPdy]. Then, the license-data receiver verifies the certificate C[KPdy] of the license-data transmitter. Only in a case that the license-data transmitter device has been authorized, the license-data receiver transmits the session information E(Kcy, E(KPdy, Ksx)//KPpx) to the license-data transmitter in response to the challenge information. The license-data transmitter provides the license data to the license-data receiver using the key Ksx and KPpx thus received.

6 Claims, 13 Drawing Sheets

U.S. PATENT DOCUMENTS

| | | | |
|---|---|---|---|
| 7,542,568 B2 * | 6/2009 | Ohmori et al. | 380/201 |
| 7,584,351 B2 * | 9/2009 | Kakii | 713/157 |
| 7,716,139 B2 * | 5/2010 | Brown et al. | 705/76 |
| 7,742,605 B2 * | 6/2010 | Hornak | 380/277 |
| 7,912,224 B2 * | 3/2011 | Lee et al. | 380/278 |
| 2002/0013772 A1 * | 1/2002 | Peinado | 705/51 |
| 2002/0038420 A1 * | 3/2002 | Collins et al. | 713/156 |
| 2002/0056747 A1 * | 5/2002 | Matsuyama et al. | 235/382 |
| 2002/0069361 A1 * | 6/2002 | Watanabe et al. | 713/185 |
| 2002/0107803 A1 * | 8/2002 | Lisanke et al. | 705/51 |
| 2003/0105718 A1 * | 6/2003 | Hurtado et al. | 705/51 |
| 2003/0163700 A1 * | 8/2003 | Paatero | 713/175 |
| 2003/0200437 A1 * | 10/2003 | Oishi | 713/175 |
| 2003/0212892 A1 * | 11/2003 | Oishi | 713/168 |
| 2004/0172533 A1 * | 9/2004 | DeMello et al. | 713/164 |
| 2005/0005146 A1 * | 1/2005 | Kryeziu | 713/193 |
| 2005/0076208 A1 * | 4/2005 | Hori et al. | 713/165 |
| 2005/0086504 A1 * | 4/2005 | You et al. | 713/193 |
| 2005/0097057 A1 * | 5/2005 | DeMello et al. | 705/57 |
| 2005/0172118 A1 * | 8/2005 | Nasu | 713/156 |
| 2005/0192907 A1 * | 9/2005 | Blinn et al. | 705/59 |
| 2005/0209975 A1 * | 9/2005 | So et al. | 705/71 |
| 2006/0018473 A1 * | 1/2006 | Hori | 380/255 |
| 2006/0020784 A1 * | 1/2006 | Jonker et al. | 713/157 |
| 2006/0106836 A1 * | 5/2006 | Masugi et al. | 707/101 |
| 2008/0028209 A1 * | 1/2008 | Dare et al. | 713/157 |
| 2008/0260156 A1 * | 10/2008 | Baba et al. | 380/277 |

* cited by examiner

METHOD FOR TRANSMISSION/RECEPTION OF CONTENTS USAGE RIGHT INFORMATION IN ENCRYPTED FORM, AND DEVICE THEREOF

BACKGROUND OF THE INVENTION

1. Field of the Invention

The present invention relates to a data input/output technique, and particularly to a technique for input/output of encrypted data, which is to be kept secret, between a storage device and a host device.

2. Description of the Related Art

As a contents data distribution system with improved security of license data, a contents data distribution system disclosed in Japanese Patent Application Laid-open No. 2004-133654 is known, for example. With such a system, the devices handling the license data in the non-encrypted form are classified into three kinds of devices, i.e., a server, a memory card (storage device), and a decoder (user device). Transmission/reception of the license data is performed between the devices (between the server and the storage device, or between the storage device and the user device) through an encrypted communication path established therebetween. Note that each of the recording device, the storage device, and the user device, includes a TRM (Tamper Resistant Module) for handling the license data in the non-encrypted form.

With establishment of the encrypted communication path, first, a device providing license data (which will be referred to as "license provider") transmits a certificate including a public key to a device receiving the license data (which will be referred to as "license receiver"). Then, the license provider verifies the certificate of the license receiver. As a result of the verification, only in a case that determination has been made that the certificate is valid, and the certificate is not listed in the certification revocation list, key sharing is performed between the two devices using the public key included in the certificate. Then, the license provider encrypts the license data using the key provided from the license receiver as a result of key sharing, and transmits the license data thus encrypted, to the license receiver.

The TRM is a circuit module which physically protects the security thereof. The TRM has a configuration which restricts access from other circuits, except through the encrypted communication path.

Note that in a case of acquisition of the license data, the memory card, which is mounted to a terminal having a function of communication with the server, receives the license data from the server through the terminal. On the other hand, in a case of using contents, the memory card, which is mounted to the terminal including a built-in decoder, transmits the license data to the decoder through the terminal.

As described above, such a contents distribution service provides encryption of the contents data and security of the license data, thereby ensuring copyright protection with regard to the contents. Such ensuring of the contents copyright protection protects the right of the copyright holder of the contents. This provides a reliable contents distribution system which allows the user to add new contents to the lineup for contents distribution with high security, thereby meeting the needs of the user over a wider range.

As described above, with conventional contents distribution systems, there is no need to give consideration to security as far as the server device, which is the license providing device, is concerned. Even if a fake server device, i.e., a spoofing server device records faked license data on a storage device which is a license receiver, such recording does not mean that leakage of contents will occur. That is to say, such spoof recording does not infringe on the right of the contents copyright holder. The same can be said of reproduction. That is to say, even if a spoofing storage device, i.e., a spoofing license provider provides fake license data to a user device which is a license receiver, legitimate encoded contents data is not reproduced. That is to say, such a spoofing license providing device does not leads to infringement of the right of the contents copyright holder through leakage of contents.

Now, let us say that the license providing device is a recorder having a function of digital recording of video signals or video data using the copyright protection function. A contents data distribution system including such a recorder must be designed giving consideration to risk from a recorder with breached security (in a case that the security of an authorized recorder is breached due to a certain reason) or a spoofing recorder. In general, recorders receives contents data which is to be recorded, through broadcasting or line input (RCF terminal, S terminal, IEEE1394, and so forth). Such contents must be recorded while keeping protection factors determined beforehand for each input method, recording conditions multiplexed with the contents data signal, and so forth. Any recorder which does not satisfy these conditions should be considered to be a device with insufficient security for protecting the right of the contents copyright holder. Since it is almost impossible to completely prevent such license providing devices with insufficient security from providing such unauthorized license data, the storage device, which is a license receiver, should be designed so as to have a function of rejecting such unauthorized license data. In the same way, the user device should be designed so as to have a function of rejecting such unauthorized license data provided from a storage device with insufficient security or a spoofing storage device.

The present invention has been made in view of the above problems, and accordingly, it is an object thereof to provide a recording device and a host device having a function of input/output of confidential data in an encrypted form which allows input/output of contents data with high security in a sure manner.

SUMMARY OF THE INVENTION

In view of the aforementioned problems, the present invention has the features as follows. That is to say, the present invention provides a technique which allows a license providing device (recorder or storage device) and a license receiver (storage device or user device) to exchange license data therebetween with high security in a sure manner. Furthermore, the present invention provides another technique which allows the license receiver to reject recording of the license data provided from license providing devices with insufficient security or fake license providing devices.

A first aspect of the present invention relates to a contents usage right information transmission method for transmission/reception of contents usage right information containing a contents key for decrypting encrypted contents data. The contents usage right information transmission method comprises: establishing an encrypted communication path for transmission/reception of the content usage right information; and transmitting and/or receiving the content usage right information through the encrypted communication path, wherein the establishing the encrypted communication path includes: a transmitter of the content usage right information verifying a receiver thereof by acquiring a first certificate of the receiver and authorizing the first certificate; the receiver of the content usage right information verifying the transmitter thereof by acquiring a second certificate of the transmitter and authorizing the second certificate; sharing a first symmetric key between the transmitter and the receiver by exchanging the first symmetric key encrypted using a first public key contained in the first certificate between the transmitter and the receiver, and sharing a second symmetric key between the transmitter and the receiver by exchanging the second symmetric key encrypted using a second public key contained in the second certificate and the first symmetric key between the transmitter and the receiver, in a case that the receiver has been authorized by the transmitter, and the transmitter has been authorized by the receiver, and wherein the transmitting and/or receiving the content usage right information is executed in a case that the second symmetric key has been shared between the transmitter and the receiver.

With such an arrangement, the contents usage right information receiving device has a function of rejecting recording of the license data provided from contents usage right information providing devices with insufficient security or fake contents usage right information providing devices. This improves the security of the devices handling the contents usage right information, thereby properly protecting the right of the author and so forth.

The transmitting and/or receiving the content usage right information may include the transmitter encrypting the content usage right information using at least the second symmetric key and transmitting the content usage right information thus encrypted to the receiver.

The sharing the second symmetric key may further exchange a third public key of the receiver encrypted with the second symmetric key, and the establishing the encrypted communication path may include sharing a third symmetric key using the third public key, and the transmitting and/or receiving the content usage right information may include the transmitter encrypting the content usage right information using the third symmetric key and transmitting the content usage right information thus encrypted to the receiver.

An arrangement may be made in which one of the transmitter and the receiver issues the first symmetric key, and the other issues the second symmetric key. This prevents leakage of contents usage right information even if either of the transmitter or the receiver is an unauthorized device, thereby improving the security of the system.

The third symmetric key may be held by the transmitter and the receiver even after completion of the transmitting and/or receiving the content usage right information for transmitting the next contents usage right information using the same symmetric key. Furthermore, at the time of transmission of the contents usage right information, the establishing an encrypted communication path may be omitted. This enables consecutive transmission/reception of the contents usage right information in an encrypted form using the symmetric key cryptosystem alone at high processing speed without deterioration in security. Also, an arrangement may be made in which the verification processing is omitted in a case of consecutive transmission/reception of the contents usage right information, thereby enabling high-speed processing without deterioration in the security.

An arrangement may be made in which the third symmetric key is discarded in a case of disconnection of the encryption communication path. With such an arrangement, in a case that the encrypted communication path which has been once established cannot be maintained due to disconnection between the devices, either of the devices being turned off, or the like, for example, the first symmetric key is discarded, thereby disconnecting the encrypted communication path. This secures the security of the encrypted communication.

Furthermore, an arrangement may be made in which after completion of the transmitting and/or receiving the content usage right information, a new second symmetric key is issued and shared between the transmitter and the receiver at the time of transmission of the next content usage right information. With such an arrangement, the contents usage right information is encrypted using a new second symmetric key issued for each transmission of the contents usage right information. This improves the security of the encrypted communication.

A second aspect of the present invention relates to a contents usage right information providing device for providing contents usage right information containing a contents key for decrypting encrypted contents data to a contents usage right information receiving device. The contents usage right information providing device comprises: a verification unit which acquires a certificate from the content usage right information receiving device, and verifying the validity of the certificate thus acquired; a certificate transmitting unit which transmits a certificate thereof to the content usage right information receiving device; a first symmetric key sharing unit which shares a first symmetric key with the content usage right information receiving device using a first public key contained in the certificate; a second symmetric key sharing unit which shares a second symmetric key with the content usage right information receiving device using a second public key contained in the certificate and the first symmetric key in a case that the verification unit has authorized the content usage right information receiving device, and the content usage right information receiving device has authorized the certificate of the content usage right information providing device; an encrypting unit which encrypts the content usage right information; and a content usage right information transmitting unit which transmits the content usage right information thus encrypted by the encrypting unit, to the content usage right information receiving device in a case that the second symmetric key is shared.

A third aspect of the present invention relates to a contents usage right information receiving device for receiving contents usage right information containing a contents key for decrypting encrypted contents data from a contents usage right information providing device. The contents usage right information receiving device comprises: a verification unit which acquires a certificate from the content usage right information providing device, and verifying the validity of the certificate thus acquired; a certificate transmitting unit which transmits a certificate thereof to the content usage right information providing device; a first symmetric key sharing unit which shares a first symmetric key with the content usage right information providing device using a first public key contained in the certificate; a second symmetric key sharing unit which shares a second symmetric key with the content usage right information providing device using a second public key contained in the certificate and the first symmetric key in a case that the verification unit has authorized the content usage right information providing device, and the content usage right information providing device has authorized the certificate of the content usage right information receiving device; a content usage right information receiving unit which receives the content usage right information encrypted, from the content usage right information providing device in a case that the second symmetric key is shared; and a decrypting unit which decrypts the content usage right information encrypted.

A fourth aspect of the present invention relates to a contents usage right information providing device for providing contents usage right information containing a contents key for decrypting encrypted contents data to a contents usage right information receiving device. The contents usage right information providing device comprises: an interface for transmission/reception of data to/from the contents usage right information receiving device; a certification data holding unit for holding certification data of the contents usage right information providing device; a private key holding unit for holding a private key for decrypting data which has been encrypted using a first public key contained in the certificate data of the contents usage right information providing device; a verification unit for verifying certification data supplied from external circuits using a verification key; a symmetric key creating unit for creating a first symmetric key temporarily used for communication with the contents usage right information receiving device; a first encryption unit for encrypting data using a second public key contained in certification data supplied from external circuits; a first decryption unit for decrypting data using the first symmetric key created by the symmetric key creating unit; a second decryption unit for decrypting data using the first private key; a second encryption unit for encrypting data using a third public key supplied from external circuits; a third encryption unit for encrypting data using a second symmetric key supplied from external circuits; and a control unit. With such an arrangement, the contents usage right information providing device has a function of performing processing for transmitting key information formed of either the content usage right information or a key shared with the contents usage right information providing device so as to transmit the content usage right information to the license usage right information receiving device. The aforementioned processing comprises: processing in which the control unit receives the certification data of the contents usage right information receiving device through the interface, and transmits the certification data thus received, to the verification unit; processing in which in a case that the certification data of the contents usage right information receiving device has been authenticated, the control unit instruct the symmetric key creating unit to create the first symmetric key; processing in which the first encryption unit encrypts the first symmetric key using the second public key, and links the first symmetric key thus encrypted and the certification data of the contents usage right information providing device stored in the certification data holding unit, thereby creating linked data; processing in which the control unit outputs the linked data thus created, through the interface; processing in which the control unit receives second encrypted data through the interface, the second encrypted data being created following either of a procedure in which first encrypted data is created by encrypting one of the second symmetric key and the third public key using the first public key, the first encrypted data is linked to the other key which has not been used for creating the first encrypted data, and the linked data thus created is encrypted using the first symmetric key, thereby creating the second encrypted data, or a procedure in which first encrypted data is created by encrypting both the second symmetric key and the third public key, and the first encrypted data thus created is further encrypted using the first symmetric key, thereby creating the second encrypted data; processing in which the control unit transmits the second encrypted data thus received, to the first decryption unit; processing in which the control unit outputs third encrypted data through the interface; the third encrypted data being created by encrypting the key information in order, using the third public key and the second symmetric key; processing in which the verification unit verifies the certification data thus received, using the verification key, and transmits the verification results to the control unit as well as transmitting the second public key contained in the certification data to the first encryption unit; processing in which the first encryption unit encrypts the first symmetric key using the second public key, and transmits the first symmetric key thus encrypted, to the control unit; processing in which the first decryption unit decrypts the second encrypted data using the first symmetric key, and transmits the first encrypted data contained in the second data thus decrypted, to the second decryption unit; processing in which in a case that the second data thus decrypted contains the third public key, the third public key is transmitted to the second encryption unit; processing in which in a case that the second data thus decrypted contains the second symmetric key, the second symmetric key is transmitted to the third encryption unit; processing in which the second decryption unit decrypts the first encrypted data using the first private key; processing in which in a case that the first data thus decrypted contains third public key, the third public key is transmitted to the second encryption unit; processing in which in a case that the first data thus decrypted contains the second symmetric key, the second symmetric key is transmitted to the third encryption unit; processing in which the second encryption unit encrypts the key information using the third public key, and transmits the key information thus encrypted, to the third encryption unit; processing in which the third encryption unit further encrypts the key information, which has been encrypted using the third public key, using the second symmetric key, thereby creating the third encrypted data; and processing in which the third encrypted data thus created is transmitted to the control unit.

An arrangement may be made in which in a case that the certification data has been determined by the verification unit to be invalid, the processing is canceled.

The contents usage right information providing device may further comprise a storage unit for storing the encrypted contents data and the contents usage right information, with the storage unit including: a first storage unit for storing the encrypted contents data; and a second storage unit for storing the contents usage right information, and with the second storage unit having a tamper-resistant configuration.

The contents usage right information providing device may further comprise: a contents encryption unit for encrypting contents data, thereby creating the encrypted contents data; and a usage-right-information creating unit for creating contents usage right information corresponding to the encrypted contents data.

A fifth aspect of the present invention relates to a contents usage right information receiving device for receiving contents usage right information for decrypting and using encrypted contents data from a contents usage right information providing device. The contents usage right information receiving device comprises: an interface for transmission/reception of data to/from the contents usage right information providing device; a certification data holding unit for holding certification data of the contents usage right information receiving device; a first private key holding unit for holding a first private key for decrypting data which has been encrypted using a first public key contained in the certificate data; a second public key holding unit for holding a second public key set for the contents usage right information receiving device; a second private key holding unit for holding a second private key for decrypting data which has been encrypted using the second public key; a first decryption unit for decrypting data, which has been encrypted using the first public key, using the first private key; a verification unit for verifying certification data provided from external circuit, using a verification key; a first encryption unit for encrypting data using a third public key provided from external circuits; a second encryption unit for encrypting data using a first symmetric key provided from external circuits; a symmetric key creating unit for creating a second symmetric key temporarily used for communication with the contents usage right information providing device; a second decryption unit for decrypting data which has been encrypted using the second symmetric key; a third decryption unit for decrypting data, which has been encrypted using the second public key, using the second private key; and a control unit. With such an arrangement, the contents usage right information receiving device has a function of performing processing for receiving key information formed of either the contents usage right information or a key shared with the contents usage right information providing device so as to receive the content usage right information from the content usage right information providing device. The aforementioned processing comprises: processing in which the control unit transmits the certification data stored in the certification data holding unit to the contents usage right information providing device through the interface; processing in which the control unit receives the first symmetric key encrypted using the first public key, and the certification data of the contents usage right information providing device, through the interface; processing in which the control unit transmits the encrypted first symmetric key and the certification data of the contents usage right information providing device, to the first decryption unit and the verification unit, respectively; processing in which in a case that the verification unit has authenticated the certification data of the contents usage right information providing device, the control unit instructs the symmetric key creating unit to create the second symmetric key; processing in which the control unit transmits second encrypted data through the interface, the second encrypted data being created following either of a procedure in which first encrypted data is created by encrypting one of the second symmetric key and the second public key using the third public key, the first encrypted data is linked to the other key which has not been used for creating the first encrypted data, and the linked data thus created is encrypted using the first symmetric key, thereby creating the second encrypted data, or a procedure in which first encrypted data is created by encrypting both the second symmetric key and the second public key, and the first encrypted data thus created is further encrypted using the first symmetric key, thereby creating the second encrypted data; processing in which the control unit receives the key information through the interface in the form of third encrypted data in which the key information has been encrypted in order, using the second public key and the second symmetric key; processing in which the third encrypted data is transmitted to the second decryption unit; processing in which the first decryption unit decrypts the first symmetric key, which has been encrypted using the first public key, using the first private key; processing in which the first symmetric key thus decrypted is transmitted to the first encryption unit; processing in which the verification unit verifies the certification data thus received, using the verification key, and transmits the verification results to the control unit as well as transmitting the third public key contained in the certification data thus received, to the first encryption unit; processing in which the first encryption unit encrypts one of or both of the second symmetric key and the second public key using the third public key, thereby creating the first encrypted data; processing in which the second encryption unit creates the second encrypted data following either of a procedure in which the second encryption unit links the first encrypted data and the second symmetric key or the second public key which has not been used for creating the first encrypted data, and encrypts the linked data thus created, thereby creating the second encrypted data, or a procedure in which the second encryption unit encrypts the first encrypted data alone, thereby creating the second encrypted data; processing in which the second encrypted data thus created is transmitted to the control unit; processing in which the second decryption unit decrypts the third encrypted data using the second symmetric key, and transmits the decryption results to the third decryption unit; and processing in which the third decryption unit decrypts the data received from the second decryption unit, thereby acquiring the key information.

An arrangement may be made in which in a case that the certification data has been determined by the verification unit to be invalid, the processing is canceled.

The contents usage right information receiving may further include a storage unit for storing the encrypted contents data and the contents usage right information, with the storage unit including: a first storage unit for storing the encrypted contents data; and a second storage unit for storing the contents usage right information, and with the second storage unit having a tamper-resistant configuration.

The contents usage right information receiving device may further include: a contents decryption unit for decrypting the encrypted contents data using the decryption key contained in the contents usage right information; and a reproducing unit for reproducing contents data decrypted by the contents reproducing unit.

The features and technological significance of the present invention will become apparent from the following description of the embodiments. It should be clearly understood that the embodiments will be described for exemplary purposes only, and that the meanings of the technical terms given in this description of the present invention or the components thereof by way of embodiments are by no means intended to be interpreted restrictively.

DETAILED DESCRIPTION OF THE INVENTION

Description will be made below regarding embodiments according to the present invention with reference to the drawings.

First Embodiment

Figure 1:
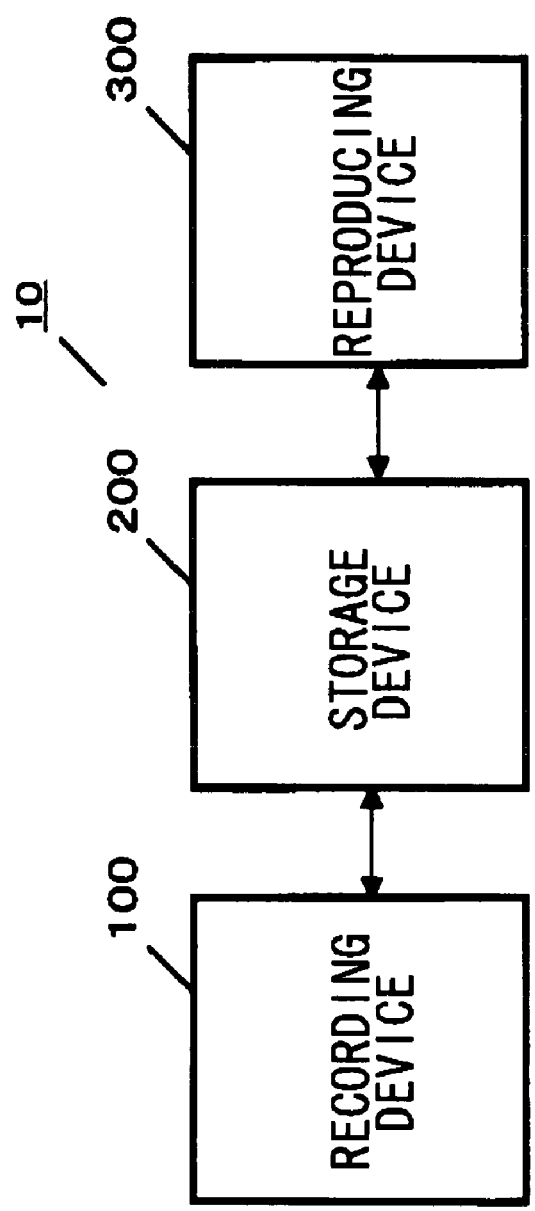
FIG. 1 is a diagram which shows an overall configuration of a data recording/reproducing device according to a first embodiment.

FIG. 1 shows an overall configuration of a data management system 10 according to a first embodiment. The data management system 10 includes: a recording device 100 for controlling recording of data on a storage device 200; a reproducing device 300 for controlling reproduction of the data recorded on the storage device 200; and the storage device 200 for storing and recording the data.

The term storage device 200 as used in the present embodiment does not represent a recording medium alone for storing data. Rather, the storage device 200 is a storage device formed of a combination of a recording medium and a drive. The storage device 200 includes a controller for controlling input/output of data between: a host device such as the recording device 100, the reproducing device 300, and so forth; and the recording medium. Description will be made in the present embodiment regarding an example employing a hard disk drive as the storage device 200.

In general, conventional hard disk drives are used in the state in which each hard disk drive is fixedly connected to a certain host device. On the other hand, the storage device 200 according to the present embodiment has a configuration which allows the user to detach the storage device 200 from a host device such as the recording device 100, the reproducing device 300, and so forth. That is to say, the user can detach the storage device 200 from the host device in the same way as with CD, DVD, and so forth. Thus, such a function allows sharing of the storage device 200 between multiple host devices such as the recording device 100, the reproducing device 300, a recording/reproducing device having both functions of recording and reproducing, and so forth.

As described above, the storage device 200 according to the present embodiment has a function of being shared between multiple host devices. This may lead a problem that the data stored in the storage device 200 is read out by a third party through an unauthorized host device.

Let us say that the storage device 200 stores contents such as audio contents, video contents, and so forth, protected by the copyright, or confidential information such as personal information, corporation data, and so forth. In order to prevent leakage of such kinds of confidential data, the storage device 200 preferably has an appropriate configuration for protecting the data, i.e., preferably has a sufficient tamper-resistant function.

From such a perspective, the storage device 200 according to the present embodiment has a configuration which allows exchange of confidential data in an encrypted form between the storage device 200 and the host device at the time of input/output of the confidential data therebetween. Furthermore, the storage device 200 has a confidential data storage area separate from an ordinary storage area, for storing confidential data. With such a configuration, no external circuit accesses the confidential data storage area except through an encryption engine included in the storage device 200. The encryption engine allows input/output of confidential data to/from a host device, only in a case that the host device has been verified as an authorized host device. Such a data protection function will also be referred to as "secure function" hereafter. The aforementioned configuration and function provides appropriate protection of the confidential data stored in the storage device 200.

The secure function of the storage device 200 is preferably designed so as to maintain the advantages of serving as a removable medium as much as possible. That is to say, the storage device 200 is preferably designed so as to allow input/output of ordinary data to/from a host device, even if the host device has no secure function. Accordingly, the storage device 200 according to the present embodiment is designed stipulated by ATA (AT attachment) which is a standard of ANSI (American National Standards Institute), thereby maintaining compatibility with conventional hard disks. That is to say, the aforementioned secure function is realized in the form of expanded commands of ATA.

Description will be made below regarding an example of input/output of confidential data in which the contents data such as video contents are recorded and reproduced. While the contents data may be handled as confidential data, description will be made below regarding an arrangement in which the contents data is encrypted, and the contents data thus encrypted is stored in the storage device 200 as ordinary data. With such a configuration, the system handles a key for decrypting the contents data thus encrypted (which will be referred to as "contents key" hereafter) and the data (which will be referred to as "license data") including information (which will be referred to as "user agreement" hereafter) regarding control for reproduction of the contents, and control for the usage, transmission, and duplication of the license, thereby enabling input/output using the aforementioned secure function. This enables input/output of data in a simple manner while maintaining sufficient tamper-resistant function, thereby enabling high-speed processing with reduced power consumption. Note that the license data includes a license ID for identifying the license data, and so forth, as well as the contents key and the user agreement.

Of commands issued by the host device such as the recording device 100, the reproducing device 300, and so forth, to the storage device 200, the expanded commands for the secure function will be referred to as "secure commands" hereafter. On the other hand, the other commands will also be referred to as "ordinary commands" hereafter.

Figure 2:
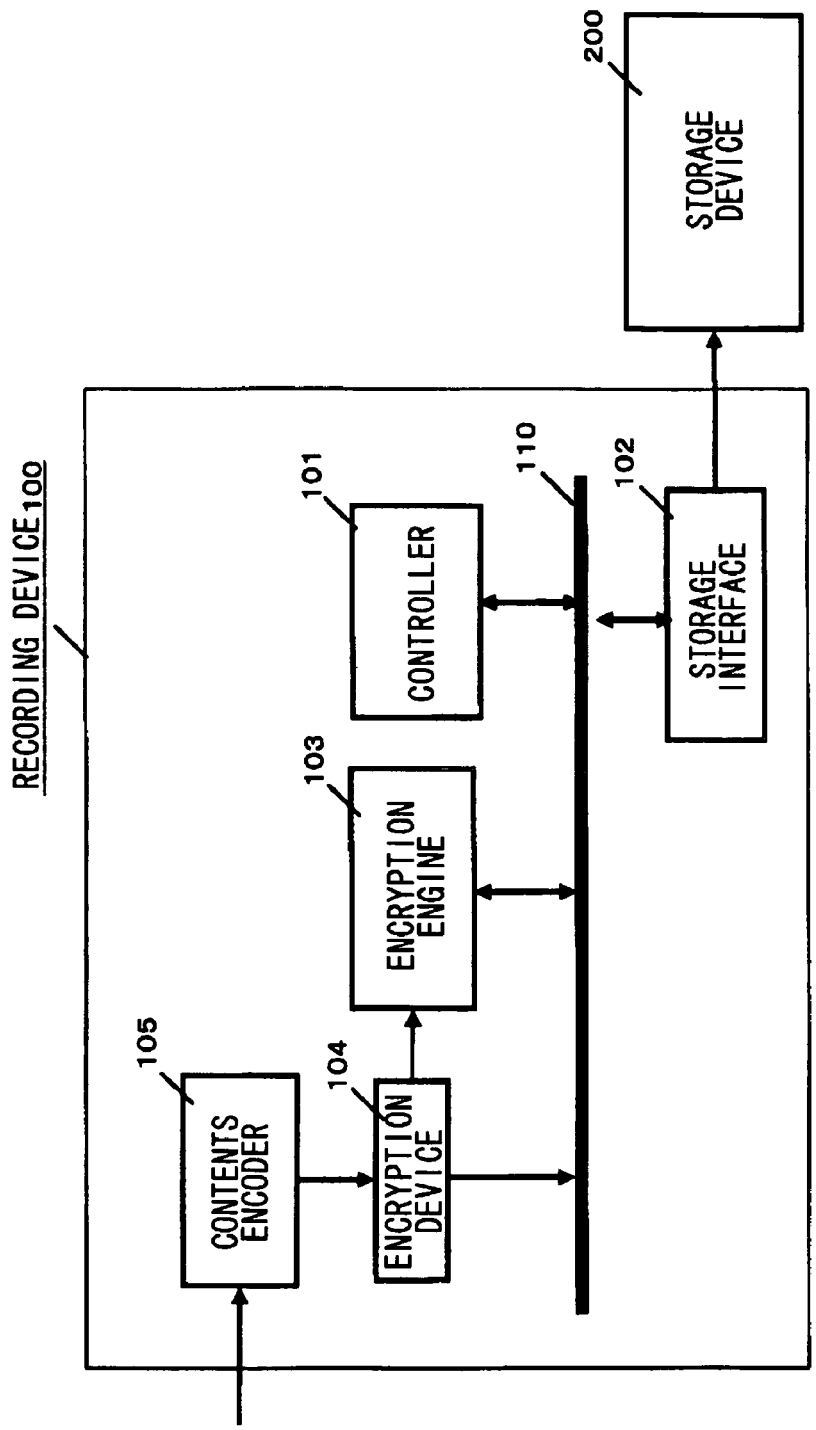
FIG. 2 is a diagram which shows an internal configuration of a recording device according to the first embodiment.

FIG. 2 shows an internal configuration of the recording device 100 according to an embodiment. Such a configuration may be realized by hardware means, e.g., by actions of a CPU, memory, and other LSIs, of a computer, and by software means, e.g., by actions of a program or the like, loaded to the memory. Here, the drawing shows a functional block configuration which is realized by cooperation of the hardware components and software components. It is needless to say that such a functional block configuration can be realized by hardware components alone, software components alone, or various combinations thereof, which can be readily conceived by those skilled in this art.

The recording device 100 principally includes a controller 101, a storage interface 102, an encryption engine 103, an encryption device 104, a contents encoder 105, and a data bus 110 for electrically connecting these components to each other.

The contents encoder 105 encodes the contents data acquired either on-line or off-line in a predetermined format. With the present embodiment, video data acquired from broadcast airwaves or the like is encoded in the MPEG format.

The encryption device 104 issues license data LIC containing a contents key for decrypting encrypted contents. The contents encoder 105 encrypts the contents data, which has been encoded by the contents encoder 105, using the contents key. The encrypted contents data is stored in the storage device 200 through the data bus 100 and the storage interface 102. Note that the encryption engine 103 is notified of the license data LIC thus issued, and the license data LIC is stored in the storage device 200 through the encryption engine 103.

The encryption engine 103 controls encrypted communication between the recording device 100 and the storage device 200, thereby allowing input of the license data LIC to the storage device 200. The storage interface 102 controls input/output of data to/from the storage device 200. The controller 101 centrally controls the components of the recording device 100.

Figure 3:
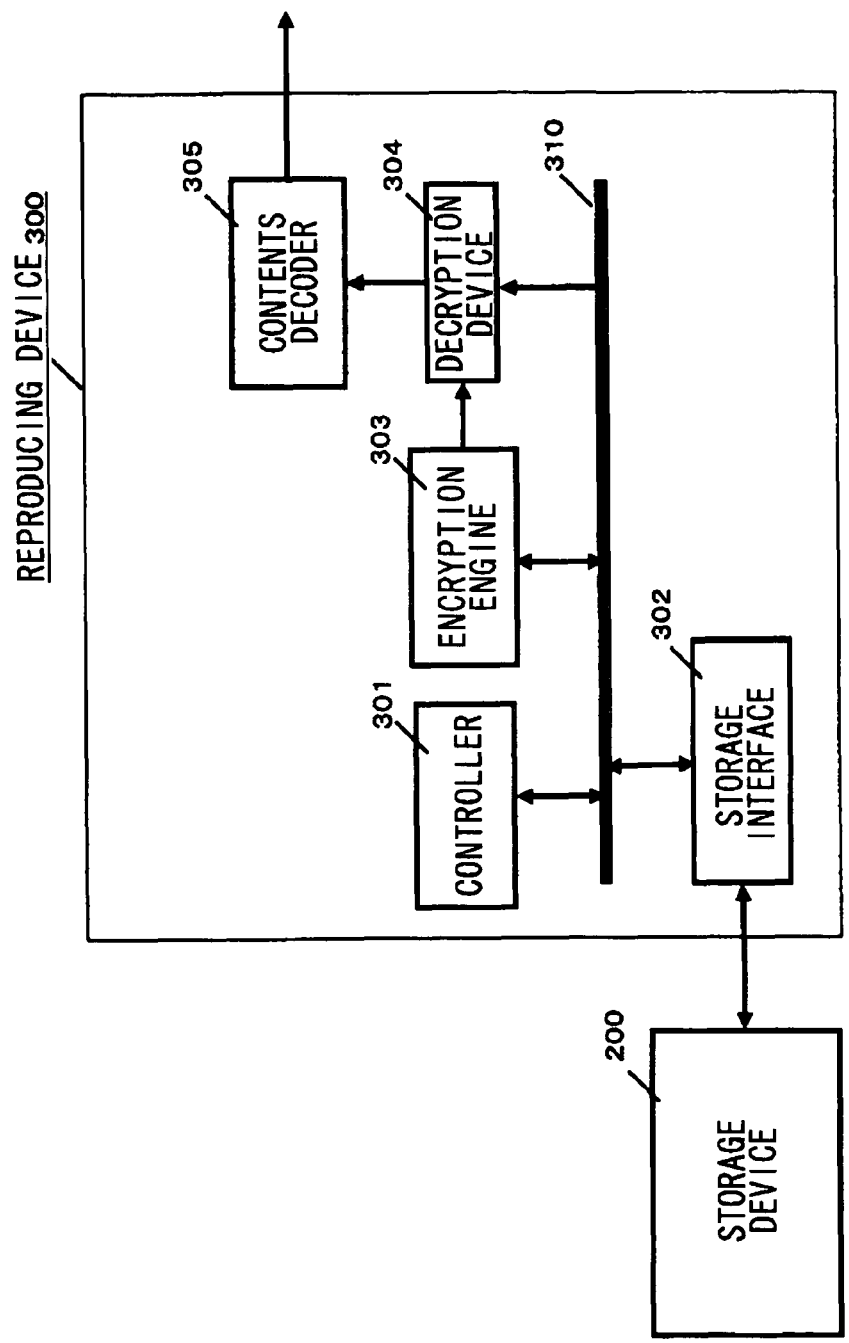
FIG. 3 is a diagram which shows an internal configuration of a reproducing device according to the first embodiment.

FIG. 3 shows an internal configuration of the reproducing device 300 according to the present embodiment. The aforementioned functional block configuration can be realized by hardware components alone, software components alone, or various combinations thereof.

The reproducing device 300 principally includes a controller 301, a storage interface 302, an encryption engine 303, a decryption device 304, a contents decoder 305, and a data bus 310 for connecting these components to each other.

The storage interface 302 controls input/output of data to/from the storage device 200. The encryption engine 303 controls encrypted communication between the storage device 200 and the reproducing device 300, thereby enabling reception of the license data LIC containing the contents key from the storage device 200.

The decryption device 304 decrypts the encrypted contents data read out from the storage device 200 using the contents key contained in the license data LIC received from the storage device 200.

The contents decoder 305 decodes the contents data decrypted by the decryption device 304, and outputs the decoded contents data. Let us say that the contents data is decoded in the MPEG format. In this case, the contents decoder 305 reproduces the video signal and the audio signal from the contents data. The video signal thus reproduced is displayed on an unshown display device. On the other hand, the audio signal thus reproduced is output to an unshown speaker. The controller 301 centrally controls the components of the reproducing device 300.

Figure 4:
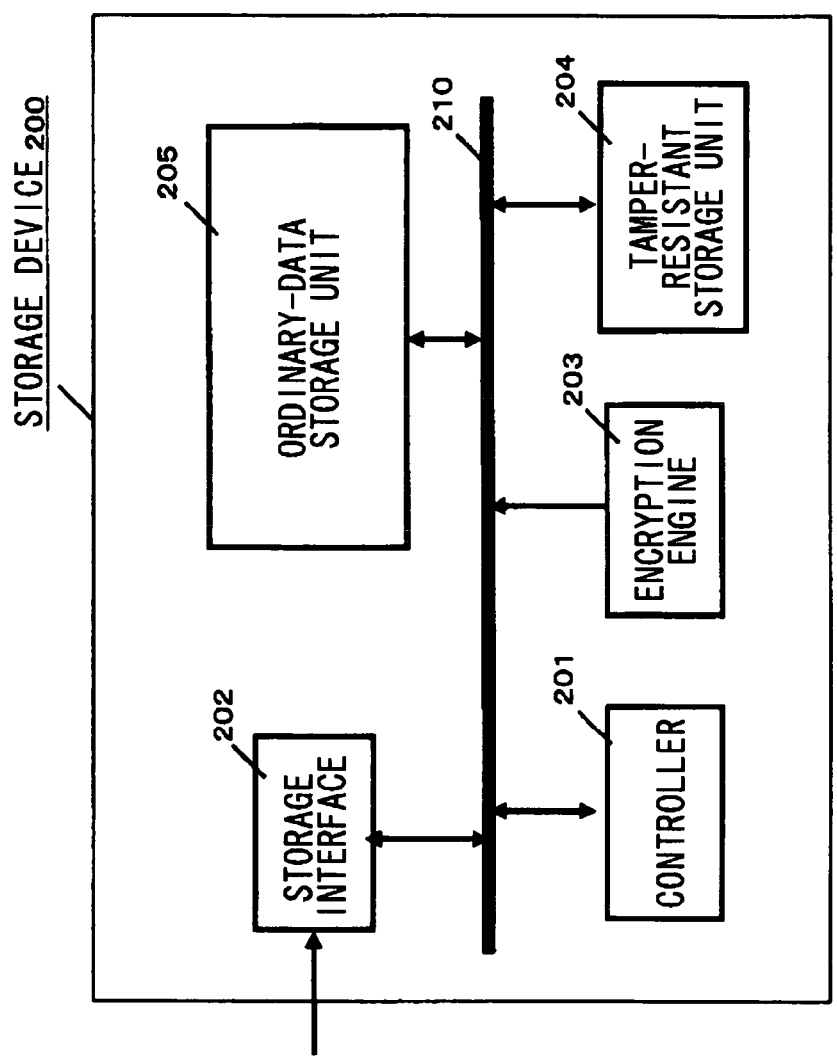
FIG. 4 is a diagram which shows an internal configuration of a storage device according to the first embodiment.

FIG. 4 shows an internal configuration of the storage device 200 according to the present embodiment. The storage device 200 principally includes a controller 200, a storage interface 202, an encryption engine 203, a tamper-resistant storage unit 204, an ordinary-data storage unit 205, and a data bus 210 for connecting these components to each other.

The storage interface 202 controls input/output of data to/from the storage device 100 and the reproducing device 300. The encryption engine 203 controls encrypted communication between: the storage device 200; and the recording device 100 and the reproducing device 300, thereby enabling input/output of confidential data such as the license data LIC containing the contents key to/from the recording device 100 and the reproducing device 300. The ordinary-data storage unit 205 serves as an ordinary-data storage area for storing the encrypted contents data, ordinary data, and so forth. On the other hand, the tamper-resistant storage unit 204 serves as a confidential-data storage area for storing confidential data such as the license data LIC containing the contents key. The ordinary-data storage unit 205 has a configuration which allows direct access from external circuits (input/output of data). On the other hand, the tamper-resistant storage unit 204 has a configuration which does not allow access from external circuits (input/output of data), except through the encryption engine 203. The controller 201 centrally controls these components of the storage device 200.

Now, description will be made regarding the keys employed in the present embodiment. In the present embodiment, all the keys are represented by text strings beginning with a capital K. Furthermore, a symmetric key (shared key) is represented by a text string in which the second letter is a lowercase "c" or "s". More specifically, a challenge key is represented by a text string in which the second letter is a lowercase "c". Note that the challenge key is a temporary symmetric key created by a transmitter of encrypted data. Also, a session key is represented by a text string in which the second letter is a lowercase "s". Note that the session key is a temporary symmetric key created by a receiver of encrypted data.

On the other hand, a public key is represented by a text string in which the second letter is a capital "P". Also, a private key forming a pair along with the public key is represented by a text string in which the second letter, i.e., the capital "P" is stripped from the text string representing the public key.

Furthermore, the keys for each device group is represented by text strings containing a lowercase "d". The keys for each device is represented by text strings containing a lowercase "p". Each of these keys is prepared in the form of a pair of a public key and a private key. Note that the public key for each group is provided in the form of a public key certificate including a digital signature.

On the other hand, the last letter of each text string which represents the corresponding key, e.g., the numeral "2" in the text string KPd2 representing a public key, serves as an index for identifying the encryption engine from which the key has been provided. In the present embodiment, a key provided by a specified encryption engine is represented by a text string in which the last letter is a numeral "1", "2", or "3". On the other hand, the keys provided by unspecified components other than the aforementioned encryption engines are represented by text strings in which the last letter is a letter of the English alphabet such as "x", "y", and so forth. In the present embodiment, the key provided by the encryption engine 103 of the recording device 100 is represented by the index numeral "1". The key provided by the encryption engine 203 of the storage device 200 is represented by the index numeral "2". The key provided by the encryption engine 303 of the reproducing device 300 is represented by the index numeral "3".

Figure 5:
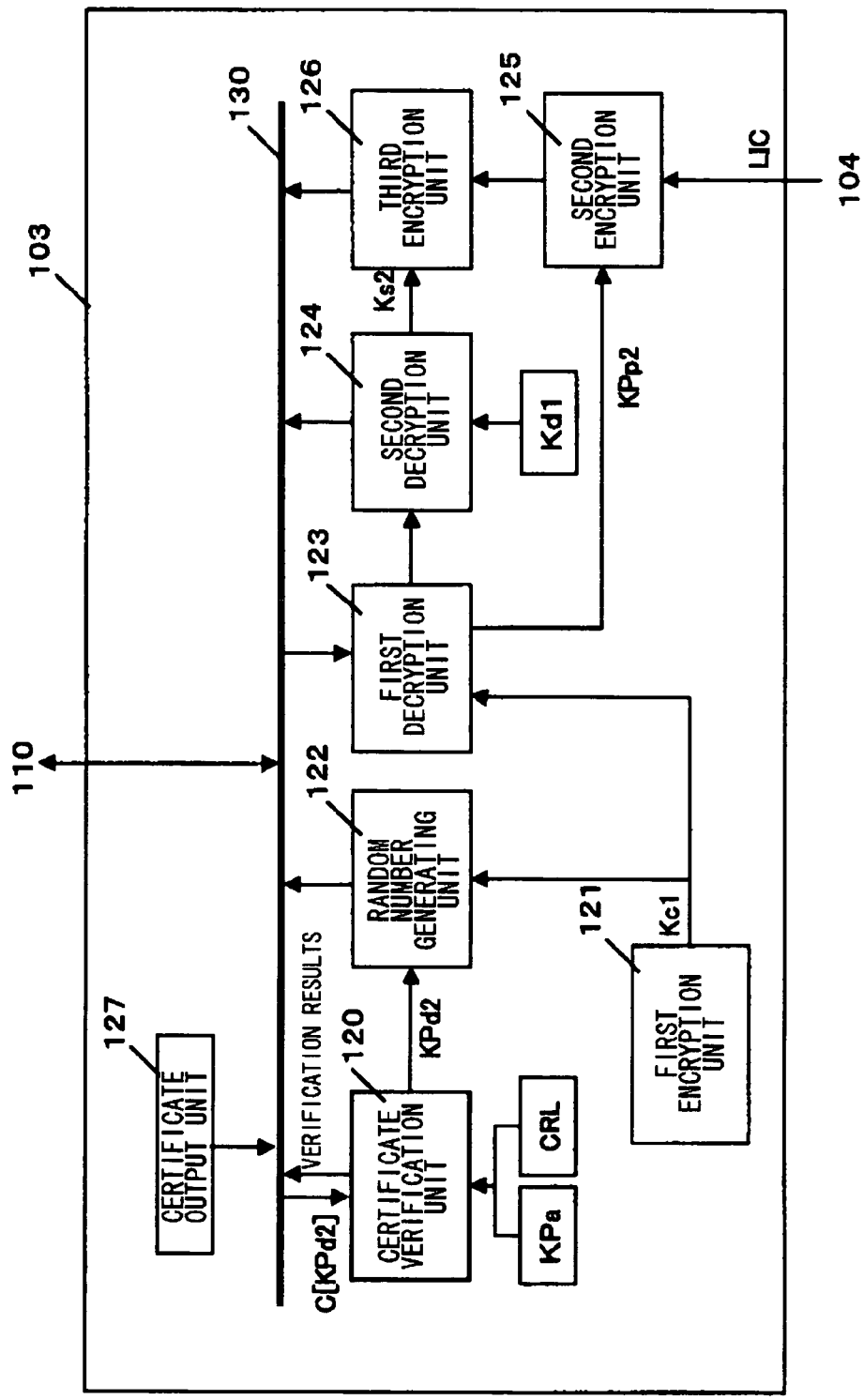
FIG. 5 is a diagram which shows an internal configuration of an encryption engine shown in FIG. 2.

FIG. 5 shows an internal configuration of the encryption engine 103 of the recording device 100 shown in FIG. 2. The encryption engine 103 includes a certification verification unit 120, a random number generating unit 121, a first encryption unit 122, a first decryption unit 123, a second decryption unit 124, a second encryption unit 125, a third encryption unit 126, a certificate output unit 127, and a local bus 130 for connecting at least a part of these components to each other.

The certificate verification unit 120 verifies the certificate C[KPd2] acquired from the storage device 200. The certificate C[KPd2] is formed of unencrypted information (which will be referred to as "certificate body" hereafter) containing the public key KPd2, and a digital signature appended to the certificate body. The digital signature is created as follows. That is to say, first, the certificate body is subjected to computation using the hash function (which will be referred to as "hash computation" hereafter). Next, the computation result thus obtained is encrypted using a root key Ka held by an Certificate Authority (not shown) which is a third party organization, thereby creating the digital signature. Note that the root key Ka is a non-public key which is strictly managed by the Certificate Authority. That is to say, the root key Ka is a private key of the Certificate Authority.

The certificate verification unit 120 holds a verification key KPa corresponding to the root key Ka; these two keys forming a key pair. The verification key KPa is a public key for verifying the validity of the certificate. The verification of the certificate is made based upon the validity of the certificate, which is to say that the certificate has not been forged, and that the certificate has not been revoked. That the certificate is not unauthorized is confirmed based upon comparison results between: the computation result obtained by performing hash function computation for the certificate body of the certificate which is to be verified; and the computation result obtained by decrypting the digital signature using the verification key KPa. In a case that these results match one another, the certificate verification unit 120 determines that the certificate is valid. Furthermore, the certificate verification unit 120 holds a certification revocation list which is a list of revoked certificates which accordingly have been invalidated. In a case that determination has been made that the certificate which is to be verified is not listed in the CRL, the certificate verification unit 120 determines that the certificate is valid. In the present embodiment, such processing, in which a certificate is authenticated and authorized based upon the validity of the certificate, will be referred to as "verification".

Upon success of verification, the certificate verification unit 120 acquires the public key KPd2 of the storage device 200. Then, the certificate verification unit 120 transmits the public key KPd2 to the first encryption unit 122, as well as making notification of the verification results. In a case of failure in verification, the certificate verification unit 120 outputs a verification error notification.

The certificate output unit 127 outputs a certificate C[KPd1] of the recording device 100. The certificate is formed of a certificate body containing the public key KPd1 of the recording device 100 and a digital signature appended to the certificate body. The digital signature is encrypted using the root key Ka of Certificate Authority in the same way as with the certificate of the storage device 200.

The random number generating unit 121 generates challenge key Kc1 temporarily used for encrypted communication between the recording device 100 and the storage device 200. The random number generating unit 121 generates the challenge key Kc1 each time that encrypted communication is performed, thereby minimizing the risk of the challenge key being cracked. The generated challenge key Kc1 is transmitted to the first encryption unit 122, and the first decryption unit 123.

In order to notify the storage device 200 of the challenge key Kc1, the first encryption unit 122 encrypts the challenge key Kc1 using the public key KPd2 of the storage device 200 acquired by the certificate verification unit 120, thereby creating an encrypted challenge key E(KPd2, Kc1). Then, the encrypted challenge key E(KPd2, Kc1) is linked to the certificate C[KPd1] output from the certificate output unit 127, thereby creating challenge information E(KPd2, Kc1)//C[KPd1]. Here, the symbol "//" represents data linking. For example, Expression E(KPd2, Kc1)//C[KPd1] represents a data sequence in which the encrypted challenge key E(KPd2, Kc1) and the certificate C[KPd1] are serially linked with each other. On the other hand, the symbol "E" represents an encryption function. For example, Expression E(KPd2, Kc1) represents a function for encrypting the challenge key Kc1 using the public key KPd2.

The first decryption unit 123 decrypts the encrypted data using the challenge key Kc1. A session key Ks2 issued by the storage device 200 and a public key KPp2 of the storage device 200 are supplied from the storage device 200 in the form of session information E(Kc1, E(KPd1, Ks2)//KPp2). With the present embodiment, the first decryption unit 123 decrypts the session information using the challenge key Kc1 generated by the random number generating unit 121, thereby acquiring the encrypted session key E(KPd1, Ks2) and the public key KPp2. The public key KPp2 and the encrypted session key E(KPd1, Ks2) thus acquired are transmitted to the second encryption unit 125 and the second decryption unit 124, respectively.

The second decryption unit 124 decrypts the data, which has been encrypted using the public key KPd1 of the recording device 100, using the private key Kd1 forming a pair along with the public key KPd1. A session key Ks2 is transmitted from the first decryption unit 123 in the form of the encrypted session key E(KPd1, Ks2). With the present embodiment, the second decryption unit 124 decrypts the encrypted session key E(KPd1, Ks2), thereby acquiring the session key Ks2. The session key Ks2 thus acquired is transmitted to the third encryption unit 126.

The second encryption unit 125 acquires the license data LIC containing the contents key issued in the processing in which the encryption device 104 encrypts the contents. Then, the second encryption unit 125 encrypts the license data LIC using the public key KPp2 of the storage device 200 which is a receiver of the license data, thereby creating E(KPp2, LIC). Subsequently, E(KPp2, LIC) thus created is transmitted to the third encryption unit 126.

The third encryption unit 126 further encrypts E(KPp2, LIC) transmitted from the second encryption unit 125 using the session key Ks2 issued by the storage device 200, thereby creating encrypted license data E(Ks2, E(KPp2, LIC)).

As shown in FIG. 5, of the components forming the encryption engine 103, the certificate verification unit 120, the first encryption unit 122, the first decryption unit 123, and the third encryption unit 126, are electrically connected with each other through the local bus 130, and further connected to the data bus 110 of the recording device 100 through the local bus 130. While various modifications may be made for connecting these components, connection of these components according to the present embodiment is designed such that the challenge key Kc1 generated by the random generating unit 121, the session key Ks2 received from the storage device 200, and the private key Kd1 of the recording device 100, are not directly available on the data bus 110. This prevents leakage of each key used in the encryption engine 103 to external circuits through other components of the recording device 100, thereby improving security.

Figure 6:
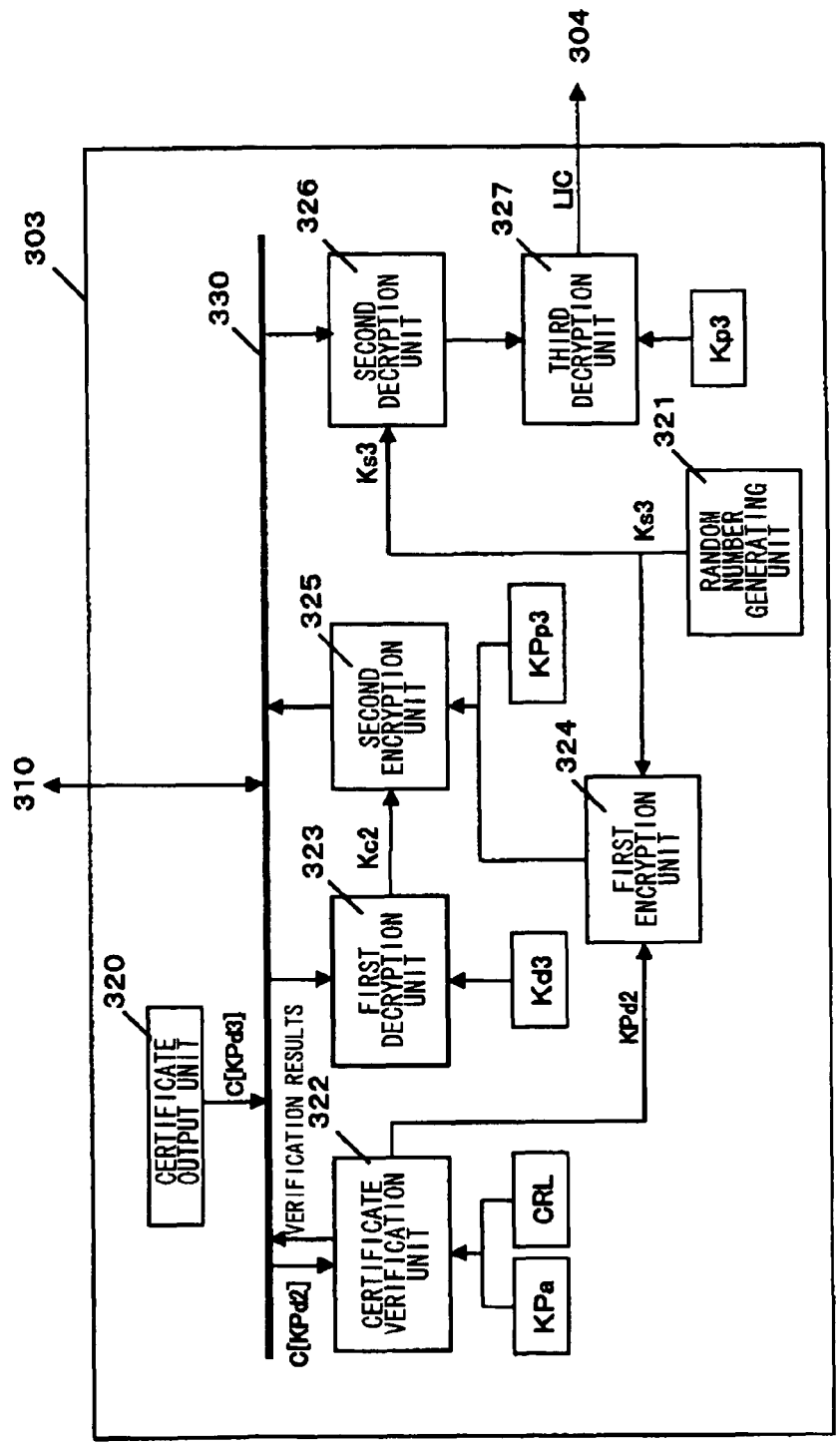
FIG. 6 is a diagram which shows an internal configuration of an encryption engine shown in FIG. 3.

FIG. 6 shows an internal configuration of the encryption engine 303 of the reproducing device 300 shown in FIG. 3. The encryption engine 303 includes: a certificate output unit 320, a random number generating unit 321, a certificate verification unit 322, a first decryption unit 323, a first encryption unit 324, a second encryption unit 325, a second decryption unit 326, a third decryption unit 327, and a local bus 330 for electrically connecting at least part of these components.

The certificate output unit 320 outputs a certificate C[KPd3] of the reproducing device 300. The certificate may be held by the certificate output unit 320. Also, an arrangement may be made in which an unshown certificate holding unit holds the certificate, and the certificate output unit 320 reads out the certificate from the certificate holding unit as necessary. The certificate is formed of the certificate body containing a public key KPd3 of the reproducing device 300 and a digital signature appended to the certificate body. The digital signature is encrypted using the root key Ka of the Certificate Authority in the same way as with the certificate of the storage device 200.

The random number generating unit 321 generates session key Ks3 temporarily used for encrypted communication between the reproducing device 300 and the storage device 200. The created session key Ks3 is transmitted to the first encryption unit 324 and the second decryption unit 326.

The certificate verification unit 322 verifies the certificate C[KPd2] of the storage device 200 acquired by the first decryption unit 323. Detailed description has been made regarding this processing, and accordingly, description thereof will be omitted.

The first decryption unit 323 decrypts the data, which has been encrypted using the public key KPd3, using a private key Kd3. In reproduction processing, a challenge key Kc2 issued by the storage device 200 is encrypted using the public key KPd3 of the reproducing device 300, and the challenge key Kc2 thus encrypted is supplied from the storage device 200. With the present embodiment, the first decryption unit 323 decrypts the encrypted challenge key Kc2 using the private key Kd3 thereof, thereby acquiring the challenge key Kc2. The challenge key Kc2 thus acquired is transmitted to the second encryption unit 325.

The first encryption unit 324 encrypts data using the public key KPd2 acquired from the certificate C[KPd2] of the storage device 200, thereby creating encrypted data. Specifically, in order to notify the storage device 200 of the session key Ks3, the first encryption unit 324 encrypts the session key Ks3 created by the random number generating unit 321, thereby creating an encrypted session key E(KPd2, Ks3). The encrypted session key E(KPd2, Ks3) thus created is transmitted to the second encryption unit 325.

The second encryption unit 325 encrypts data using the challenge key Kc2 acquired by the first decryption unit 323. Specifically, the second encryption unit 325 performs encryption processing as follows. That is to say, the second encryption unit 325 links the encrypted session key E(KPd2, Ks3) received from the first encryption unit 234 and the public key KPp3 of the reproducing device 300, and encrypts the linked key data, thereby creating session information E(Kc2, E(KPd2, Ks3)//KPp3).

The second decryption unit 326 decrypts the encrypted data using the session key Ks3. The license data is supplied from the storage device 200 in the form of the encrypted license data E(Ks3, E(KPp3, LIC)) in which the license data LIC is encrypted twofold using the public key KPp3 and the session key Ks3. With the present embodiment, the second decryption unit 326 decrypts the encrypted license data E(Ks3, E(KPp3, LIC)) using the session key Ks3, and transmits the decryption results to the third decryption unit 327.

The third decryption unit 327 decrypts the data which has been encrypted using the public key KPp3. Specifically, the third decryption unit 327 decrypts the decryption results received from the second decryption unit 326, using the private key Kp3 corresponding to the public key KPp3; these keys forming a key pair. Thus, the license data LIC is acquired. The license data LIC thus acquired is transmitted to the decryption device 304. Then, the decryption device 304 decrypts the encrypted contents data using the contents key contained in the license data LIC.

While various modifications may be made for connecting these components of the encryption engine 303 shown in FIG. 6, connection of these components according to the present embodiment is designed such that the session key Ks3 generated by the random number generating unit 321, the private keys Kd3 and Kp3 each of which forms a key pair along with the corresponding public key, and the session key Ks2 received from the storage device 200, are not directly available on the data bus 310. This prevents leakage of the decryption keys used in the encryption engine 303 to external circuits.

Figure 7:
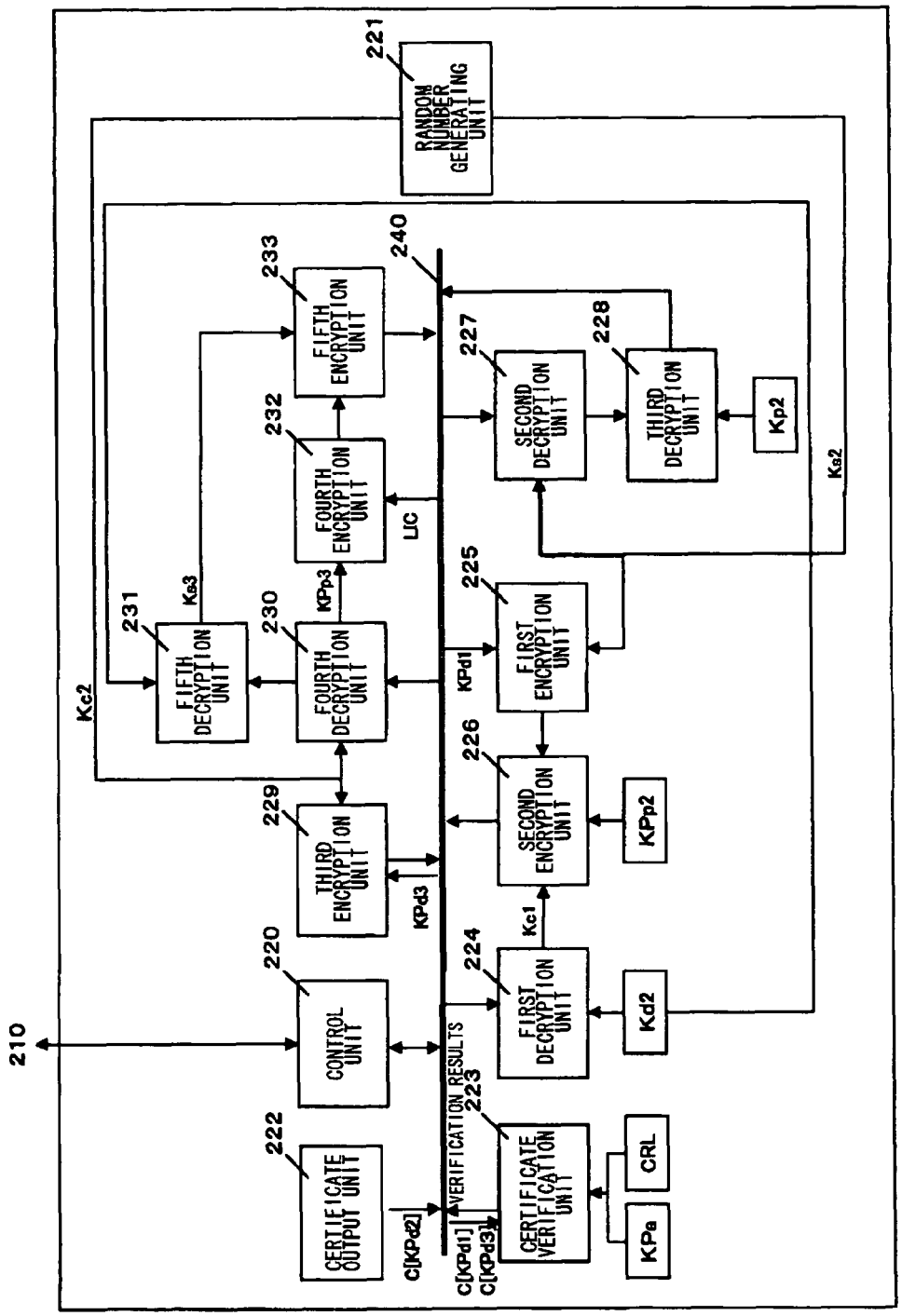
FIG. 7 is a diagram which shows an internal configuration of an encryption engine shown in FIG. 4.

FIG. 7 shows an internal configuration of the encryption engine 203 of the storage device 200 shown in FIG. 4. The aforementioned functional block configuration can also be realized by hardware components alone, software components alone, or various combinations thereof. With the present embodiment, the encryption engine 203 includes a control unit 220, a random number generating unit 221, a certificate output unit 222, a certificate verification unit 223, a first decryption unit 224, a first encryption unit 225, a second encryption unit 226, a second decryption unit 227, a third decryption unit 228, a third encryption unit 229, a fourth decryption unit 230, a fifth decryption unit 231, a fourth decryption unit 232, a fifth encryption unit 233, and a local bus 240 for electrically connecting at least a part of these components.

The control unit 220 controls the internal components of the encryption engine 203 and controls input/output of data to/from external components according to instructions from the controller 201 of the storage device 200.

The random number generating unit 221 generates the session key Ks2 or the challenge key Kc2 temporarily used for encrypted communication between the storage device 200 and either of the storage device 100 or the reproducing device 300. Specifically, in a case that the storage device 200 provides the license data, the random number generating unit 221 generates the challenge key Kc2. On the other hand, in a case that the storage device 200 receives the license data, the random number generating unit 211 generates the session key Ks2.

The certificate output unit 222 outputs the certificate C[KPd2] of the storage device 200. The certificate may be held by the certificate output unit 222. Also, an arrangement may be made in which the certificate is stored in a predetermined storage area in the storage device 200, e.g., the tamper-resistant storage unit 204, and the certificate output unit 222 reads out the certificate therefrom as necessary. The certificate is formed of the certificate body containing a public key KPd2 of the storage device 200 and a digital signature appended to the certificate body. The digital signature is encrypted using the root key Ka of the Certificate Authority.

The certificate verification unit 223 verifies the certificate provided from external components. Specifically, the certificate verification unit 223 verifies the certificate C[KPd1] acquired from the recording device 100 and the certificate C[KPd3] acquired from the reproducing device 300 using the verification key KPa. Note that detailed description has been made regarding verification processing, and accordingly, description thereof will be omitted.

The first decryption unit 224 decrypts the data, which has been encrypted using the public key KPd2 of the storage unit 200. Specifically, in a case of recording the data, the challenge key Kc1 issued by the recording device 100 is encrypted using the public key KPd2 of the storage device 200, and is provided from the recording device 100. With the present embodiment, the first decryption unit 224 decrypts the encrypted challenge key using the private key Kd2 of the storage device 200, thereby acquiring the challenge key Kc1. The challenge key Kc1 thus acquired is transmitted to the second encryption unit 226.

The first encryption unit 225 encrypts data using the public key KPd1 of the recording device 100. Specifically, the first encryption unit 225 encrypts the session key Ks2 generated by the random number generating unit 221 using the public key KPd1, thereby creating an encrypted session key E(KPd1, Ks2). The public key KPd1 of the recording device 100 used here is acquired from the certificate C[KPd1] of the storage device 200, and is transmitted through the local bus 240.

The second encryption unit 226 encrypts data using the challenge key Kc1 issued by the recording device 100. Specifically, the second encryption unit 226 links the encrypted session key E(KPd1, Ks2) and the public key KPp2 of the storage device 200, and encrypts the linked key data using the challenge key Kc1. Thus, the second encryption unit 226 creates session information E(Kc1, E(KPd1, Ks2)//KPp2).

The second decryption unit 227 decrypts the encrypted data using the session key Ks2 generated by the random number generating unit 221. Specifically, the second decryption unit 227 receives the encrypted license data from the recording device 100 in the form of E(Ks2, E(KPp2, LIC)) in which the license data LIC has been encrypted twofold using the public key KPp2 and the session key Ks2. With the present embodiment, the second decryption unit 227 decrypts the encrypted license data using the session key Ks2, and transmits the decryption results to the third decryption unit 228.

The third decryption unit 228 decrypts the data which has been encrypted using the public key KPp2 of the storage device 200. Specifically, the third decryption unit 228 decrypts the encrypted license data E(KPp2, LIC), which has been encrypted using the public key KPp2 and which has been transmitted from the second decryption unit 227, using the private key Kp2 of the storage device 200; these keys forming a key pair. Thus, the third decryption unit 228 acquires the license data LIC.

The license data LIC thus acquired is supplied to the data bus 210 through the local bus 240 and the control unit 220, and stored in the tamper-resistant storage unit 204 according to instructions from the controller 201.

The third encryption unit 229 encrypts the data using the public key KPd3 of the reproducing device 300. Specifically, in a case of supplying the license data to the reproducing device 300, the third encryption unit 229 encrypts the challenge key Kc2, which has been generated by the random number generating unit 221, using the public key KPd3 acquired from the certificate C[KPd3] received from the reproducing device 300. Thus, the third encryption unit 229 creates an encrypted challenge key E(KPd3, Kc2). The encrypted challenge key E(KPd3, Kc2) thus created is transmitted to the control unit 220 through the local bus 240. The control unit 220 links the encrypted challenge key E(KPd3, Kc2) and the certificate C[KPd2] of the storage device 200 output from the certificate output unit 222, thereby creating the challenge information E(KPd3, Kc2)//C[KPd2].

The fourth decryption unit 230 decrypts the data using the challenge key Kc2 generated by the random number generating unit 221. Specifically, the fourth decryption unit 230 decrypts the session information E(Kc2, E(KPd2, Ks3)//KPp3) received from the reproducing device 300, using the challenge key Kc2 generated by the random number generating unit 221, thereby acquiring the encrypted session key E(KPd2, Ks3) and the public key KPp3 of the reproducing device 300. The encrypted session key E(KPd2, Ks3) and the public key KPp3 thus acquired are transmitted to the fifth decryption unit 231 and the fourth encryption unit 232.

The fifth decryption unit 231 decrypts the data which has been encrypted using the public key KPp3 of the reproducing device 300. Specifically, the fifth decryption unit 231 decrypts the encrypted session key E(KPd2, Ks3) using the private key Kd2 of the storage device 200, thereby acquiring the session key Ks3 issued by the reproducing device 300. The session key Ks3 thus acquired is transmitted to the fifth encryption unit 233.

The fourth encryption unit 232 encrypts the data using the public key KPp3 of the reproducing device 300. Specifically, in a case of supplying the license data to the reproducing device 300, the fourth encryption unit 232 encrypts the license data LIC using the public key KPp3 received from the reproduction device 300. The license data LIC is read out from the tamper-resistant storage unit 204, and is transmitted to the fourth encryption unit 232 through the data bus 210, the control unit 220, and the local bus 240, according to instructions from the controller 201.

The fifth encryption unit 233 encrypts the data using the session key Ks3 issued by the reproducing device 300. Specifically, the fifth encryption unit 233 further encrypts the encrypted license data, which has been encrypted by the fourth encryption unit 232 using the public key KPp3 of the reproducing device 300, using the session key Ks3, thereby creating encrypted license data E(Ks3, E(KPp3, LIC)).

Figure 8:
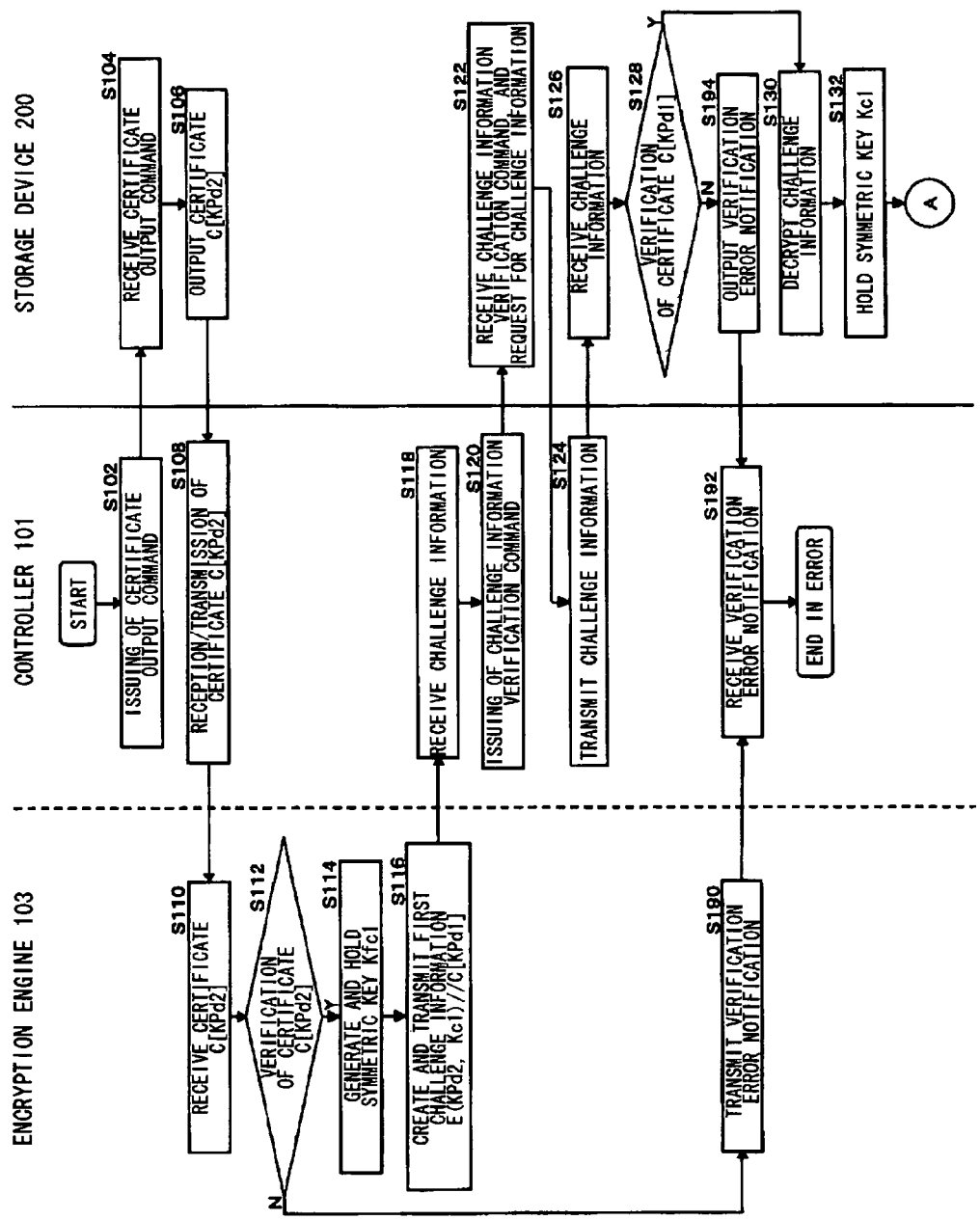
FIG. 8 is a diagram which shows a procedure up to a step in which the recording device stored license data in the storage device.
Figure 9:
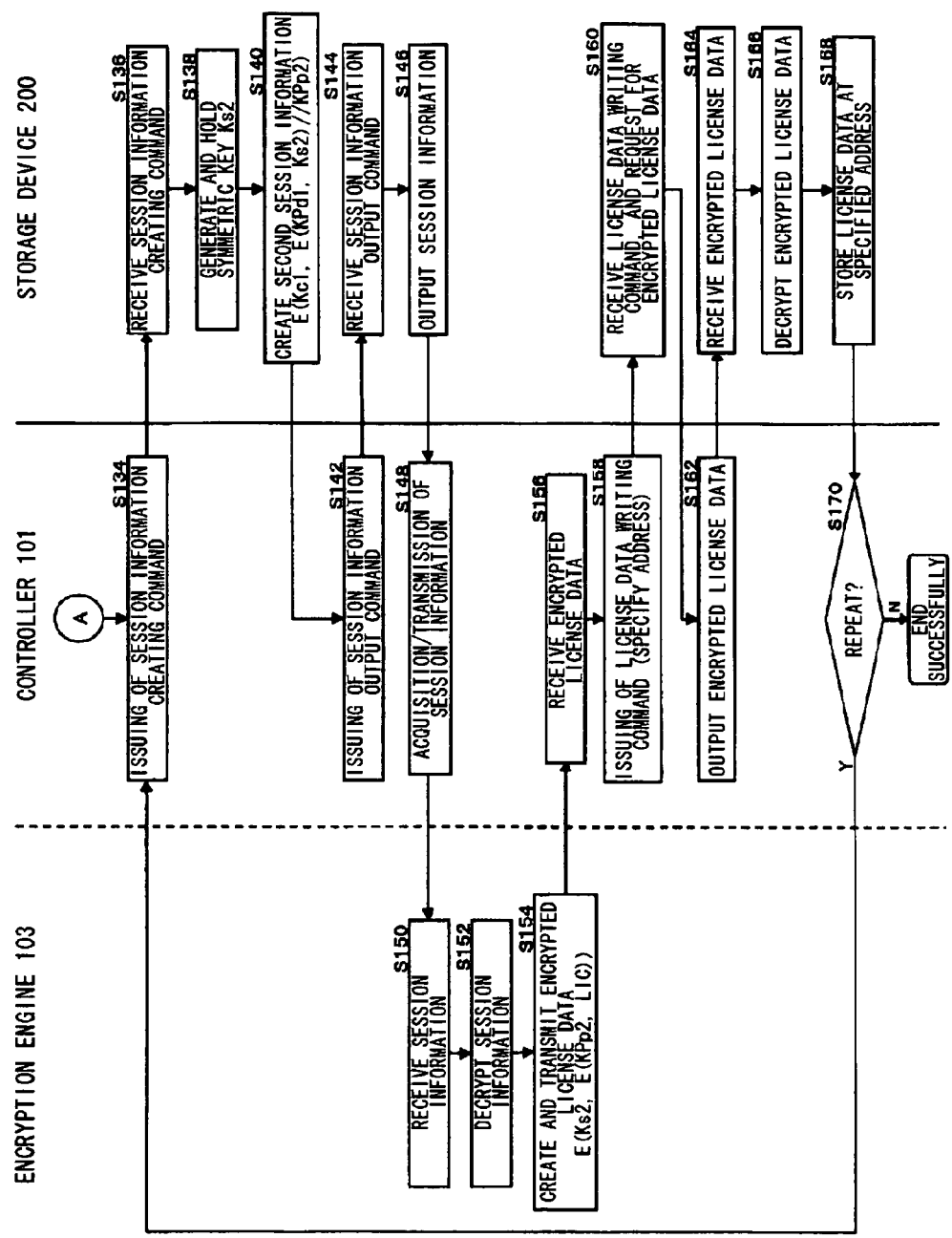
FIG. 9 is a diagram which shows a procedure up to a step in which the recording device stores license data in the storage device.

FIGS. 8 and 9 show the procedure of the recording device 100 for recording the license data on the storage device 200.

First, the controller 101 of the recording device 100 issues a certificate output command to the storage device 200 (S102). Upon successful reception of the certificate output command (S104), the controller 201 of the storage device 200 instructs the encryption engine 203 to output the certificate. Then, the controller 201 outputs the certificate C[KPd2] thus read out, to the recording device 100 (S106).

Upon reception of the certificate C[KPd2] from the storage device 200, the controller 101 transmits the certificate to the encryption engine 103 of the recording device 100 (S108). Upon the encryption engine 103 receiving the certificate C[KPd2] of the storage device 200 (S110), the certificate verification unit 120 verifies the certificate using the verification key KPa (S112). In a case that the certificate has not been authenticated (in a case of "NO" in S112), the certificate verification unit 120 transmits a verification-error notification to the controller 101 (S190). In a case that the controller 101 has received an error notification (S192), the processing ends in error.

In a case that the certificate has been authenticated (in a case of "YES" in S112), the encryption engine 103 generates the challenge key Kc1 by actions of the random number generating unit 121, and transmits the challenge key Kc1 thus generated, to the first encryption unit 122 and the first decryption unit 123. The first decryption unit 123 holds the challenge key Kc1 therein (S114). The first encryption unit 122 encrypts the challenge key Kc1 using the public key KPd2 of the storage device 200, thereby creating an encrypted challenge key E(KPd2, Kc1). Then, the encryption engine 103 links the encrypted challenge key E(KPd2, Kc1) and the certificate C[KPd1] of the recording device 100, thereby creating challenge information E(KPd2, Kc1)//C[KPd1], and transmits the challenge information thus created, to the controller 101 (S116).

Upon reception of the challenge information E(KPd2, Kc1)//C[KPd1] (S118), the controller 101 issues a challenge information verification command to the storage device 200 (S120). Upon the controller 201 of the storage device 200 receiving the challenge information verification command, the storage device 200 makes a request of input of the challenge information E(KPd2, Kc1)//C[KPd1] (S122). In response to the request, the controller 101 of the recording device 100 outputs the challenge information E(KPd2, Kc1)// C[KPd1] to the storage device 200 (S124).

Upon the storage device 200 receiving the challenge information E(KPd2, Kc1)//C[KPd1] (S126), the control unit 220 of the encryption engine 203 acquires the certificate C[KPd1] from the challenge information E(KPd2, Kc1)//C[KPd1], and transmits the certificate C[KPd1] thus acquired, to the certificate verification unit 223. The certificate verification unit 223 verifies the certificate C[KPd1] thus received, and transmits the verification results to the control unit 220 (S128). In a case that the certificate has not been authenticated (in a case of "NO" in S128), the certificate verification unit 223 transmits a verification error notification to the control unit 220. Then, the control unit 220 notifies the controller 201 of the verification results. Subsequently, the controller 201 transmits a verification error notification to the controller 101 through the storage interface 202 (S194). In a case that the controller 101 has received the error notification (S192), the processing ends in error.

In a case that the certificate has been authenticated (in a case of "YES" in S128), the control unit 220 acquires the public key KPd1 and the encrypted challenge key E(KPd2, Kc1) from the challenge information E(KPd2, Kc1)//C [KPd1]. The public key KPd1 and the encrypted challenge key E(KPd2, Kc1) thus acquired are transmitted to the first encryption unit 225 and the first decryption unit 224, respectively. The first encryption unit 225 holds the public key KPd1 thus received. On the other hand, the first decryption unit 224 decrypts the encrypted challenge key E(KPd2, Kc1) using the private key Kd2 of the storage device 200, thereby acquiring the challenge key Kc1 (S130). Then, the challenge key Kc1 thus acquired by the first decryption unit 224 is held by the second encryption unit 226 (S132).

On the other hand, upon completion of the processing instructed by the challenge information verification command in the storage device 200, the controller 101 of the recording device 100 issues a session information creating command to the storage device 200 (S134). Upon the controller 201 of the storage device 200 receiving the session information creating command (S136), the random number generating unit 221 generates the session key Ks2 according to instructions from the control unit 220 in the encryption engine 203 of the storage device 200. The session key Ks2 thus generated is transmitted to the second decryption unit 227 and the first encryption unit 225. Note that the second decryption unit 227 holds the session key Ks2 thus received (S138).

The first encryption unit 225 encrypts the session key Ks2 using the public key KPd1 stored therein, thereby creating an encrypted session key E(KPd1, Ks2). The encrypted session key E(KPd1, Ks2) thus created is transmitted to the second encryption unit 226. The second encryption unit 226 links encrypted session key E(KPd1, Ks2) and the public key KPp2 of the storage device 200, and encrypts the linked key data using the challenge key Kc1 held in Step S132. Thus, the second encryption unit 226 creates session information E(Kc1, E(KPd1, Ks2)//KPp2) (S140).

On the other hand, upon completion of the processing instructed by the session information creating command in the storage device 200, the controller 101 of the recording device 100 issues a session information output command (S142). Upon the storage device 200 receiving the session information output command (S144), the controller 201 reads out the session information E(Kc1, E(KPd1, Ks2)//KPp2), and outputs the session information thus read out, to the controller 101 of the recording device 100 (S146).

Upon the controller 101 of the recording device 100 receiving the session information E(Kc1, E(KPd1, Ks2)//KPp2), the controller 101 transmits the session information thus received, to the encryption engine 103 (S148). Upon the encryption engine 103 receiving the session information E(Kc1, E(KPd1, Ks2)//KPp2) from the controller 101 (S150), the first decryption unit 123 decrypts the session information E(Kc1, E(KPd1, Ks2)//KPp2) using the challenge key Kc1 stored therein, thereby acquiring the encrypted session key E(KPd1, Ks2) and the public key KPp2 of the storage device 200. Then, the second decryption unit 124 decrypts the encrypted session key E(KPd1, Ks2) acquired by the first decryption unit 123, using the private key Kd1 thereof, thereby acquiring the session key Ks2 (S152).

Subsequently, the second encryption unit 125 of the encryption engine 103 encrypts the license data LIC issued by the encryption device 104 using the public key KPp2 of the storage device 200. Then, the third encryption unit 126 further encrypts the encrypted license data LIC, which has been encrypted by the second encryption unit 125, using the the session key Ks2 issued by the storage device 200, thereby creating the encrypted license data E(Ks2, E(KPp2, LIC)). The encrypted license data E(Ks2, E(KPp2, LIC)) thus created is transmitted to the controller 101 (S154).

Upon the controller 101 receiving the encrypted license data E(Ks2, E(KPp2, LIC)) (S156), the controller 101 issues a license data writing command to the storage device 200 (S158). The license writing command includes an address for specifying the recording location in the tamper-resistant storage unit 204. Note that the address used here means "logical address". While the logical address does not directly specify the recording location in the tamper-resistant storage unit 204, the controller 201 manages storage of data with the logical address, thereby allowing the user to read out the data using the same logical address as in the writing processing. Also, the storage device 200 may employ the physical address for directly specifying the recording location in the tamper-resistant storage unit 204.

Upon the storage device 200 receiving the license writing command (S160), the storage device 200 makes a request of input of the encrypted license data, to the controller 101 of the recording device 100. In response to the request, the controller 101 of the recording device 100 outputs the encrypted license data E(Ks2, E(KPp2, LIC)) to the storage device 200 (S162). Upon the storage device 200 receiving the encrypted license data E(Ks2, E(KPp2, LIC)) (S164), the storage device 200 transmits the encrypted license data E(Ks2, E(KPp2, LIC)) thus received, to the second decryption unit 227 in the encryption engine 203.

The second decryption unit 227 decrypts the encrypted license data E(Ks2, E(KPp2, LIC)) using the session key Ks2 stored therein, thereby acquiring the encrypted license data E(KPp2, LIC), which has been encrypted using the public key KPp2 of the storage device 200. Then, the encrypted license data E(KPp2, LIC) thus acquired is transmitted to the third decryption unit 228. The third decryption unit 228 decrypts the encrypted license data E(KPp2, LIC) thus received, using the private key Kp2 forming a pair along with the public key KPp2, thereby acquiring the license data LIC (S166). The license data LIC thus acquired is supplied to the data bus 210 through the local bus 240 and the control unit 220. The controller 201 performs storage processing for storing the license data LIC thus supplied to the data bus 210, in a recording location in the tamper-resistant storage unit 204 according to a specified address (S168).

On the other hand, upon completion of the processing instructed by the license data writing command in the storage device 200, the controller 101 determines whether or not recording of the license data is to be continued (S170).

In a case of consecutively recording of the license data (in a case of "YES" in S170), the flow proceeds to Step S134, thereby restarting the processing starting from issuing of the session information creating command. With the present embodiment, the verification of the certificate is shared among multiple license-data writing procedures, thereby reducing the processing amount. While description has been made regarding an example in which multiple license data sets are consecutively recorded, with such a configuration, there is no need to record the next license data immediately following recording of certain license data. Rather, with such a configuration, the next data may be recording at a desired timing as long as the encryption engine 103 and the storage device 200 share the same challenge key Kc1, and specifically, as long as the first decryption unit 123 of the encryption engine 103 of the recording device 100 and the second encryption unit 226 of the encryption engine 203 of the storage device 200 hold the same challenge key Kc1.

Also, an arrangement may be made without any problems, in which the next data is recorded following the procedure starting from Step S102 even if the license data is consecutively recorded. On the other hand, in a case that the license data is not consecutively recorded (in a case of "NO" in S170), the processing ends successfully.

With the procedure described above, the license data, which is necessary for decrypting and reproducing the encrypted contents data, is stored in the storage device 200. On the other hand, the encrypted contents data is ordinary data. With the present embodiment, the encrypted contents data is directly stored in the ordinary data storage unit 205 of the storage device 200 according to ordinary commands. Note that description will be omitted regarding the storage processing for the ordinary data.

Note that the recording order of the license data and the encrypted contents data is not restricted. Furthermore, an arrangement may be made in which the secure command is issued in a divided form using free time in which the storage device 200 is not storing the encrypted contents data, thereby recording the license data. Note that FIGS. 8 and 9 show an example of the procedure in which the recording device 100 stores the license data in the storage device 200, and the processing ends successfully.

Figure 10:
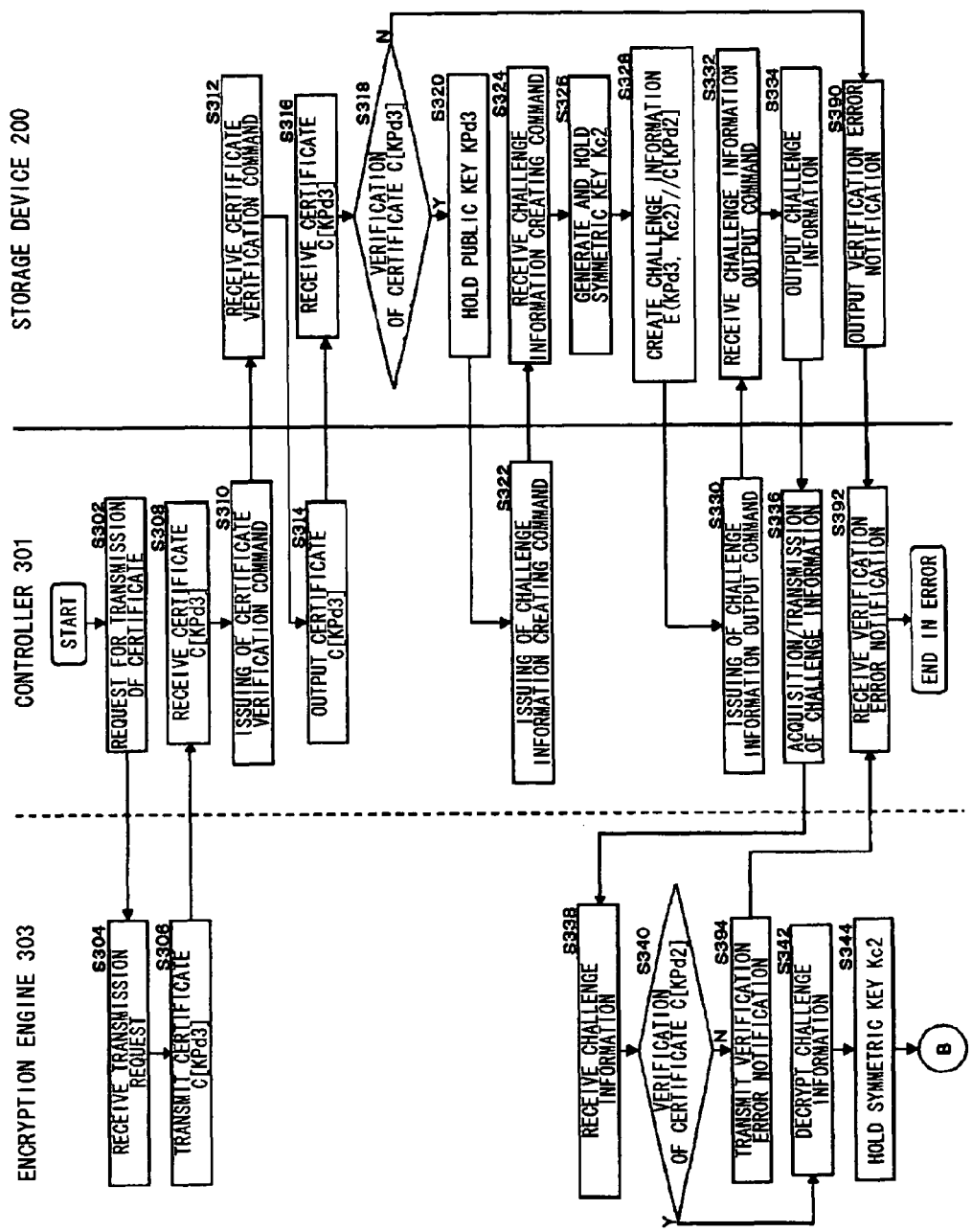
FIG. 10 is a diagram which shows a procedure up to a step in which the reproducing device reads out license data from the storage device.
Figure 11:
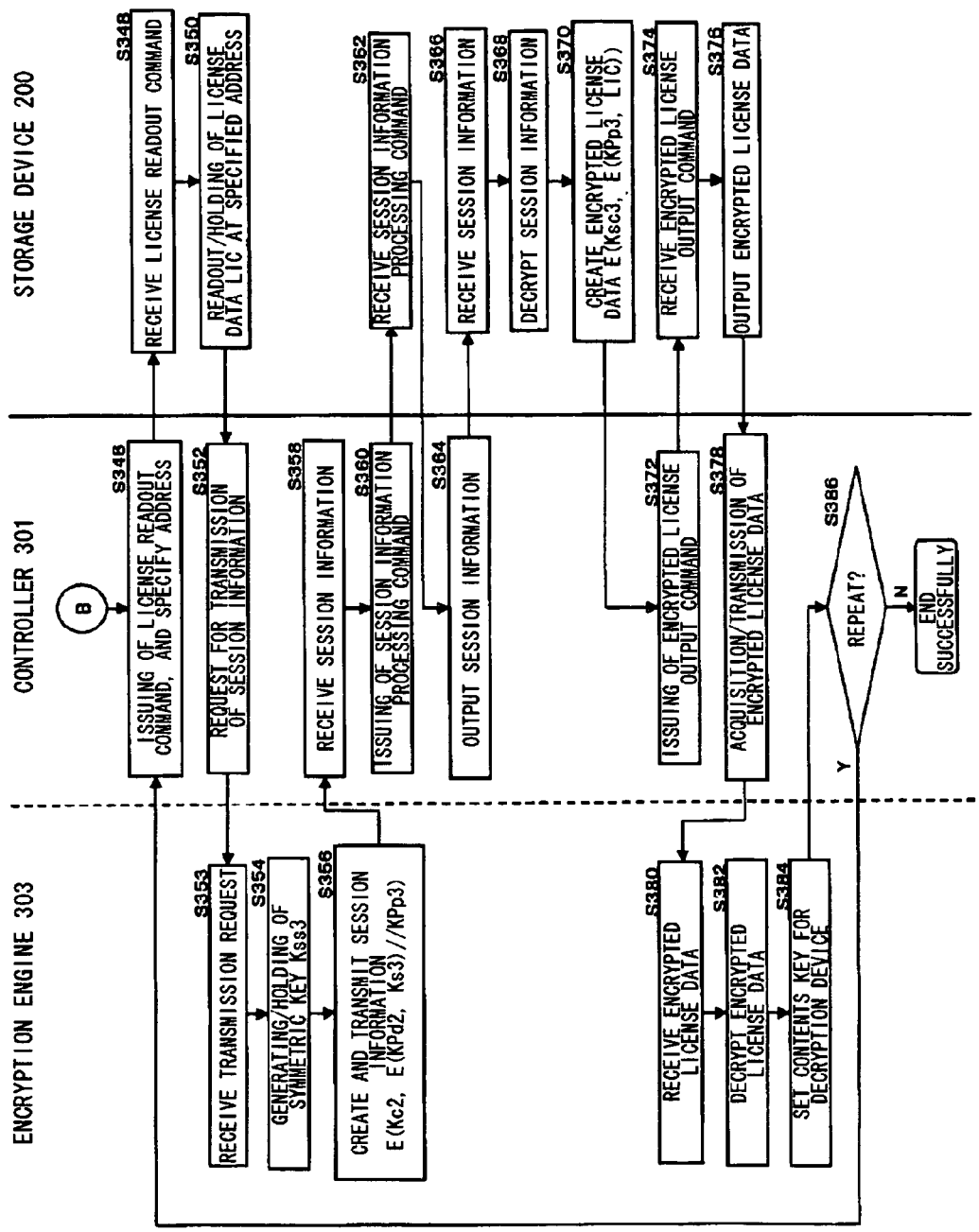
FIG. 11 is a diagram which shows a procedure up to a step in which the reproducing device reads out the license data from the storage device.

FIGS. 10 and 11 show the procedure up to the step in which the reproducing device 300 reads out the license data from the storage device 200. First, the controller 301 of the reproducing device 300 makes a request of output of the certificate to the encryption engine 303 (S302). Upon the encryption engine 303 receiving the transmission request (S304), the certificate output unit 320 outputs the certificate C[KPd3] to the controller 301 (S306). Upon the controller 301 receiving the certificate C[KPd3] from the encryption engine 303 (S308), the controller 301 issues the certificate verification command to the storage device 200 (S310).

Upon the storage device 200 receiving the certificate verification command (S312), the storage device 200 makes a request of input of the certificate. In response to the request, the controller 301 of the reproducing device 300 outputs the certificate. C[KPd3] received from the encryption engine 303, to the storage device 200 (S314). Upon the storage device 200 receiving the certificate C[KPd3] (S316), the storage device 200 transmits the certificate C[KPd3] to the encryption engine 203 therewithin. In the encryption engine 203, the certificate verification unit 223 verifies the certificate C[KPd3] using the verification key KPa according to instructions from the control unit 220 (S318). In a case that the certificate has not been authenticated (in a case of "NO" in S318), the certificate verification unit 223 transmits a verification error notification to the controller 301 through the control unit 220, the controller 201, and the storage interface 202 (S390). In a case that the controller 301 has received the error notification (S392), the processing ends in error. On the other hand, in a case that the certificate C[KPd3] has been authenticated (in a case of "YES" in S318), the control unit 220 of the encryption engine 203 acquires the public key KPd3 from the certificate C[KPd3], and transmits the public key KPd3 thus acquired, to the third encryption unit 229. The third encryption unit 229 holds the public key KPd3 thus received (S320).

On the other hand, in a case that the certificate C[KPd3] of the encryption engine 303 is authenticated in the storage device 200, the controller 301 of the reproducing device 300 issues a challenge information creating command to the storage device 200 (S322). Then, the storage device 200 receives the challenge information creating command (S324). Subsequently, in the encryption engine 203, the random number generating unit 221 generates the challenge key Kc2 according to instructions from the control unit 220, and transmits the challenge key Kc2 thus generated, to the third encryption unit 229 and the fourth decryption unit 230. The fourth decryption unit 230 stores the challenge key Kc2 therewithin (S326). Then, the third encryption unit 229 encrypts the challenge key Kc2 using the public key KPd3 stored in Step S320, thereby creating an encrypted challenge key E(KPd3, Kc2). Then, the storage device 200 receives the certificate C[KPd2] thereof from the certificate output unit 222, and links the encrypted challenge key E(KPd3, Kc2) and the certificate C[KPd2], thereby creating challenge information E(KPd3, Kc2)//C[KPd2] (S328).

On the other hand, upon completion of the processing instructed by the challenge information creating command in the storage device 200, the controller 301 of the reproducing device 300 issues a challenge information output command (S330). Upon the storage device 200 receiving the challenge information output command (S332), the controller 201 acquires the challenge information E(KPd3, Kc2)//C[KPd2], and outputs the challenge information thus acquired, to the controller 301 of the reproducing device 300 (S334).

Upon reception of the challenge information E(KPd3, Kc2)//C[KPd2], the controller 301 of the reproducing device 300 transmits the challenge information thus received, to the encryption engine 303 (S336). Then, upon the encryption engine 303 receiving the challenge information E(KPd3, Kc2)//C[KPd2] (S338), the certificate verification unit 322 of the encryption engine 303 verifies the certificate using the verification key KPa (S340). In a case that the certificate has not been authenticated (in a case of "NO" in S340), the certificate verification unit 322 transmits a verification error notification to the controller 301 (S394). In a case that the controller 301 has received the error notification (S392), the processing ends in error.

On the other hand, in a case that the certificate has been authenticated (in a case of "YES" in S340), the first decryption unit 323 of the encryption engine 303 decrypts the encrypted challenge key E(KPd3, Kc2) using the private key Kd3 of the reproducing device 300, thereby acquiring the challenge key Kc2 (S342). Subsequently, the challenge key Kc2 thus acquired is held by the second encryption unit 325 (S344).

On the other hand, the controller 301 issues a license readout command to the storage device 200 (S346). The license readout command includes an address for specifying the readout location in the tamper-resistant storage unit 204. Upon the storage device 200 receiving the license readout command (S348), the storage device 200 reads out the license data LIC stored at the specified address in the tamper-resistant storage unit 204. The license data LIC thus read out is held by the fourth encryption unit 232 of the encryption engine 203 (S350).

On the other hand, the controller 301 makes a request of transmission of the session information to the encryption engine 303 (S352). Upon the encryption engine 303 receiving the transmission request (S353), in the encryption engine 303, the random number generating unit 321 generates the session key Ks3, and transmits the session key Ks3 thus generated, to the first encryption unit 324 and the second decryption unit 326. The second decryption unit 326 stores the session key Ks3 thus received (S354). Then, the first encryption unit 324 encrypts the session key Ks3 using the public key KPd2 of the storage device 200 acquired from the certificate C[KPd2], thereby creating an encrypted session key E(KPd2, Ks3). The encrypted session key E(KPd2, Ks3) thus created is transmitted to the second encryption unit 325. The second encryption unit 325 links the encrypted session key E(KPd2, Ks3) and the public key KPp3 of the reproducing device 300, and encrypts the linked key data using the challenge key Kc2 stored in Step S344, thereby creating session information E(Kc2, E(KPd2, Ks3)//KPp3). The session information thus created is transmitted to the controller 301 (S356). Upon the controller 301 receiving the session information E(Kc2, E(KPd2, Ks3)//KPp3) from the encryption engine 303, the controller 301 issues a session information processing command to the storage device 200 (S360).

Upon the storage device 200 receiving the session information processing command (S362), the storage device 200 makes a request of input of the session information. In response to the request, the controller 301 of the reproducing device 300 outputs the session information E(Kc2, E(KPd2, Ks3)//KPp3) received from the encryption engine 303, to the storage device 200 (S364). Upon the storage device 200 receiving the session information E(Kc2, E(KPd2, Ks3)//KPp3) (S366), the storage device 200 transmits the session information thus received, to the fourth decryption unit 230 of the encryption engine 203. The fourth decryption unit 230 decrypts the session information E(Kc2, E(KPd2, Ks3)//KPp3) thus received, using the challenge key Kc2 stored in Step S326. Thus, the fourth decryption unit 230 acquires the encrypted session key E(KPd2, Ks3) and the public key KPp3 of the reproducing device 300, and transmits the encrypted session key E(KPd2, Ks3) and the public key KPp3 to the fifth decryption unit 231 and the fourth encryption unit 232, respectively. Subsequently, the fifth decryption unit 231 decrypts the encrypted session key E(KPd2, Ks3) using the private key Kd2 forming a pair along with the public key KPd2 of the storage device 200, thereby acquiring the session key Ks3 issued by the reproducing device 300. The session key Ks3 thus acquired is transmitted to the fifth encryption unit 233 (S368). On the other hand, the fourth encryption unit 232 encrypts the license data LIC stored in Step S350 using the public key KPp3 of the reproducing device 300 thus received, and the license data thus encrypted is transmitted to the fifth encryption unit 233. The fifth encryption unit 233 encrypts the encrypted license data E(KPp3, LIC), which has been created by the fourth encryption unit 232, using the session key Ks3 received from the fifth decryption unit 231, thereby creating the encrypted license data E(Ks3, E(KPp3, LIC)) (S370).

On the other hand, upon completion of the processing instructed by the session information processing command in the storage device 200, i.e., upon creation of the encrypted license data, the controller 301 of the reproducing device 300 issues an encrypted-license output command (S372). Upon the storage device 200 receiving the encrypted-license output command (S374), the controller 201 acquires the encrypted license data E(Ks3, E(KPp3, LIC)) from the encryption engine 203, and outputs the encrypted license data E(Ks3, E(KPp3, LIC)) thus acquired, to the controller 301 of the reproducing device 300 (S376).

Upon reception of the encrypted license data E(Ks3, E(KPp3, LIC)) from the storage device 200, the controller 301 of the reproducing device 300 transmits the encrypted license data E(Ks3, E(KPp3, LIC)) thus received, to the encryption engine 303 (S378). Then, upon the encryption engine 303 receiving the encrypted license data (S380), the second decryption unit 326 decrypts the encrypted license data E(Ks3, E(KPp3, LIC)) using the session key Ks3 stored therein in Step S354, and transmits the decryption result E(KPp3, LIC) to the third decryption unit 327. The third decryption unit 327 decrypts the decryption result E(KPp3, LIC) thus received, using the private key Kp3 forming a pair along with the public key KPp3 of the reproducing device 300, thereby acquiring the license data LIC (S382). Then, the license data is transmitted to the decryption device 304 (S384). The license data is used by the decryption device 304 for decrypting the encrypted contents data. With the procedure described above, the reproducing device 300 reads out the license data necessary for decrypting the encrypted contents data, from the storage device 200.

On the other hand, let us consider a situation in which other license data is consecutively read out following readout of certain license data (in a case of "YES" in S386), the controller 301 may operate as follows. That is to say, the flow proceeds to Step S346, thereby restarting the procedure starting from the step where the license readout command is issued. With the present embodiment, the verification of the certificate is shared among multiple license-data readout procedures, thereby reducing the processing amount. While description has been made regarding an example in which multiple license data sets are consecutively read out, with such a configuration, there is no need to read out the next license data immediately following readout of certain license data. Rather, with such a configuration, the next data may be read out at a desired timing as long as the encryption engine 303 and the storage device 200 share the challenge key Kc2, and specifically, as long as the second encryption unit 325 of the encryption engine 303 of the reproducing device 300 and the fourth decryption unit 230 of the encryption engine 203 of the storage device 200 hold the same challenge key Kc2. Also, an arrangement may be made without any problems, in which the next data is read out following the procedure starting from Step S302 even if the license data is consecutively read out. On the other hand, in a case that the license data is not consecutively read out (in a case of "NO" in S386), the processing ends successfully according to instructions from the controller 301.

With the recording processing according to the present invention, the license data stored in the storage device 200 can be duplicated in other storage devices (i.e., the license data stored in the storage device is available for use by other storage devices), thereby storing the license data in other storage devices. Also, with such recording processing, the license data stored in the storage device 200 can be moved to another storage device (i.e., the license data stored in the storage device 200 is deleted or revoked), thereby storing the license data in another storage device. Let us say that other storage devices, in which the license data are to be stored, have the same functions as the storage device 200. In this case, it is needless to say that the license data can be transmitted from one to another among these storage devices, and the storage device, which has received the license data, can store the license data thus received. In this case, the license data is transmitted from the storage device 200 to another storage device in the same way as the license data is supplied from the storage device 200 to the reproducing device 300. Also, the license data is transmitted from other storage devices to the storage device 200 in the same way as the license data supplied from the recording device 100 is stored in the storage device 200.

With the present embodiment as described above, first, the license-data transmitter (In a case of recording, the recording device 100 serves as the license-data transmitter, and in a case of readout, the storage device 200 serves as the license-data transmitter) verifies the certificate C[KPdx] (The license-data receiver and the license-data transmitter will be represented by "x" and "y", respectively) of the license-data receiver (In a case of recording, the storage device 200 serves as the license-data receiver, and in a case of readout, the reproducing device 300 serves as the license-data receiver). Subsequently, the license-data transmitter transmits the certificate C[KPdy] of the license-data transmitter to the receiver in the form of the challenge information E(KPdx, Kcy)//C[KPdy]. Then, the license-data receiver verifies the certificate C[KPdy] thus received. In a case that the transmitter device has not been authorized, the processing is interrupted. This allows the license-data receiver to reject the license data provided from unauthorized license-data transmitters.

Now, description will be made regarding verification serving as a countermeasure against a so-called "spoofing attack". Let us consider the spoofing attack in which the challenge information is forged. In this case, the spoofing attack is made forging either of the certificate C[KPdy] or the challenge key Kcy. With the present embodiment, the license-receiver verifies the certificate C[KPdy], and accordingly, no forged certificate C[KPdy] is authenticated, thereby preventing the spoofing attack involving forging of the certificate C[KPdy].

Next, let us consider a spoofing attack involving forging the challenge key Kcy. The public key KPd2 of the storage device 200 can be acquired from the certificate C[KPd2] with ease. Accordingly, it is easy for the third party to forge challenge information E(KPdx, Kcz)//C[KPdy] in which the encrypted challenge key E(KPdx, Kcy) is replaced with a forged encrypted challenge key E(KPdx, Kcy) using a forged challenge key Kcz (z represents a spoofing device). In this case, the certificate C[KPdy] is an authorized certificate, and accordingly, the license-data receiver receives the forged challenge key Kcz. In response to the forged challenge information, the license-data receiver transmits session information E(Kcz, E(KPdy, Ksx)//KPpx). The spoofing transmitter receives the session information E(Kcz, E(KPdy, Ksx)//KPpx), and decrypts the session information E(Kcz, E(KPdy, Ksx)//KPpx) thus received, using the forged challenge key Kcz, thereby acquiring the second public key KPp2 of the storage device 200. However, the spoofing transmitter cannot acquire the session key Ksx since the session key Ksx is encrypted using the public key KPdy of the authorized license-data transmitter device. The session key Ksx is necessary for providing the license data. Accordingly, such a spoofing transmitter cannot provide the license data to the receiver device.

Furthermore, leakage of the public key KPpx due to such a spoofing attack leads to no problem. Thus, the security of the system is not affected by the spoofing attack.

With the present embodiment, the license-data receiver verifies the validity of the license-data transmitter. Furthermore, only in the event that the transmitter device has been authorized, the license-data receiver receives the license data. Furthermore, such an arrangement according to the present embodiment allows the receiver device to reject the license data in the event that transmitter device has not been authorized.

Description has been made regarding an arrangement in which the session information is transmitted in the form of E(Kcy, E(KPdy, Ksx)//KPpx). Also, an arrangement may be made in which the session information is transmitted in the form of E(Kcy, E(KPdy, Ksx//KPpx)) or E(Kcy, Ksx//E(KPdy, KPpx)), thereby having the same advantages.

That is to say, with the present embodiment, the license-data receiver encrypts at least one of the two keys, i.e., the public key KPpx and the session key Ksx, which are to be transmitted to the license-data transmitter from the license-data receiver as session information, using the public key KPdy acquired from the transmitter certificate C[KPdy] verified by the license-data receiver. Then, the license-data receiver links the key which has not been encrypted by the public key KPdy and the key which has been encrypted by the public key KPdy, thereby creating linked key data. Furthermore, the license-data receiver encrypts the linked key data using the challenge key Kcy, thereby creating the session information.

As an example, description will be made below regarding verification using the session information in the form of E(Kcy, Ksx//E(KPdy, KPpx)), which serves as a countermeasure against the spoofing attack.

Such an arrangement prevents the spoofing attack involving forging of the certificate C[KPdy] in the same way as described above. Next, let us consider the spoofing attack involving forging of the challenge key Kcy. In this case, the spoofing transmitter device receives the session information E(Kcz, Ksx//E(KPdy, KPpx)) as a response to transmission of forged challenge information, and decrypts the session information E(Kcz, Ksx//E(KPdy, KPpx)) thus received, using the forged challenge key Kcz, thereby acquiring the session key Ksx created by the storage device 200. However, the second public key KPpx is encrypted using the public key KPdy of the authorized transmitter device. Accordingly, the spoofing transmitter device cannot acquire the public key KPpx of the receiver device. Note that the data encrypted by the public key KPpx cannot be guessed without the private key Kpy managed by the license data transmitter as own key, even if the public key KPpx of the receiver device is acquired by the spoofing device. Thus, the security of the license data is not affected by the spoofing attack. Note that it is needless to say that the same can be said of an arrangement in which the session information is transmitted in the form of E(Kcy, E(KPdy, Ksx//KPpx)), and accordingly description thereof will be omitted.

Description has been made in the present embodiment regarding an arrangement in which the license data containing a contents key is transmitted in a form encrypted using the second public key KPpx of the receiver device and the session key Ksx thereof. The order of encryption may be arbitrary, however, an arrangement may be made in which the license data is encrypted in the form of E(KPpx, E(Ksx, LIC)).

Also, an arrangement may be made in which the license data is transmitted using an additional key. With such an arrangement, the additional key may be transmitted from the license-data transmitter to the license-data receiver in a form encrypted using the second public key KPpx of the receiver device and the session key Ksx, thereby allowing the additional key to be shared between the transmitter device and the receiver device. For example, an arrangement may be made in which an additional temporary symmetric key Kt is created by the license-data transmitter, and the additional temporary symmetric key Kt is transmitted to the receiver device in a form encrypted using the second public key KPpx of the receiver device and/or the session key Ksx in the same way as with transmission of the license data. While description has been made in the present embodiment regarding an arrangement in which the license data LIC is transmitted in the form of encrypted license data E(Ksx, E(KPpx, LIC)), an arrangement may be made as follows. That is to say, the license data is transmitted in the form of encrypted license data E(Ksx, E(Kt, LIC)) using the additional temporary key Kt. This omits encryption processing using the public key cryptosystem after the first transmission of the license data in a case of consecutively transmitting the license data, thereby realizing improved high-speed consecutive transmission of the license data. In this case, the key Kt is used in transmission of plural license data. Also, an arrangement may be made in which the license data is encrypted in the form of E(Kt, E(Ksx, LIC)). Furthermore, an arrangement may be made in which new temporary symmetric keys are shared as necessary using the temporal symmetric key Kt. That is to say, with the present embodiment, the receiver device transmits the two keys of the second public key KPpx thereof and the session key Ksx as session information to the license-data transmitter. Then, the license-data transmitter transmits such an additional key in a form encrypted twofold using these two keys for sharing the additional key between the transmitter device and the receiver device, thereby allowing transmission of the contents key (license data) from the license-data transmitter to the license-data receiver. With such an arrangement, as many such temporary symmetric keys as necessary can be shared.

Second Embodiment

Figure 12:
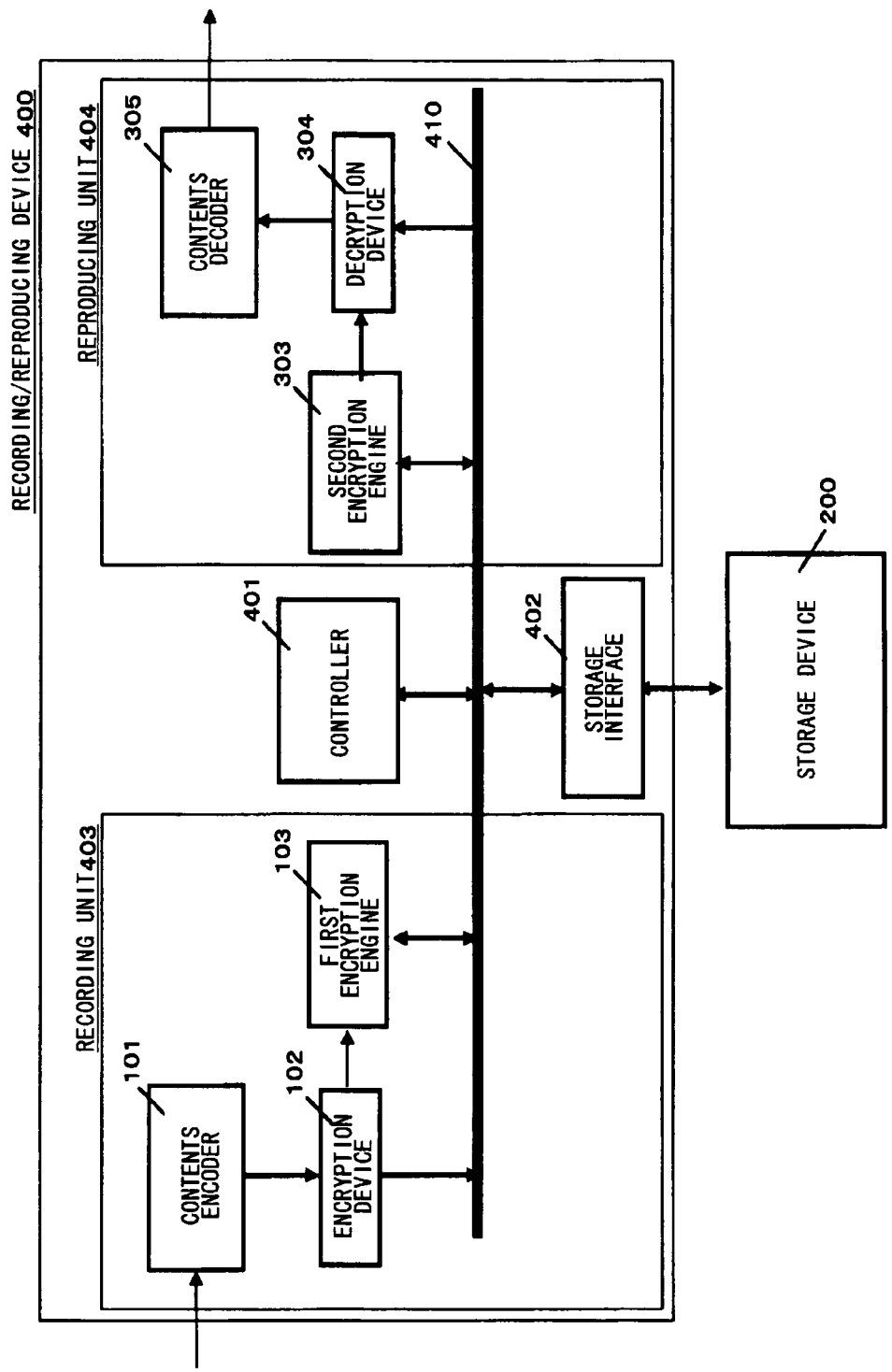
FIG. 12 is a diagram which shows an internal configuration of a recording/reproducing device according to a second embodiment.

FIG. 12 shows a configuration of a recording/reproducing device 400 according to a second embodiment. With the present embodiment, the recording device 100 and the reproducing device 300 according to the first embodiment are realized in the form of a single device, i.e., the recording/reproducing device 400.

The recording/reproducing device 400 according to the present embodiment includes a controller 401, a storage interface 402, a recording unit 403, a reproducing unit 404, and a data bus 410 for connecting at least a part of these components.

The recording unit 403 has the same configuration as that of the recording device 100 according to the first embodiment shown in FIG. 2. On the other hand, the reproducing unit 404 has the same configuration as that of the reproducing device 300 shown in FIG. 3. Note that in the drawing, the same components as those in the first embodiment are denoted by the same reference numerals.

The first encryption engine 103 according to the present embodiment corresponds to the encryption engine 103 of the recording device 100 according to the first embodiment. The second encryption engine 303 according to the present embodiment corresponds to the encryption engine 303 of the reproducing device 300 according to the first embodiment.

The first encryption engine 103 according to the present embodiment has the same internal configuration as that of the encryption engine 103 according to the first embodiment shown in FIG. 5. The second encryption engine 303 according to the present embodiment has the same internal configuration as that of the encryption engine 303 according to the first embodiment shown in FIG. 6.

The controller 401 has both the same functions as those of the controller 101 of the recording device 100 and the same functions as those of the controller 301 of the reproducing device 300 according to the first embodiment. The storage interface 402 controls input/output of data between the recording/reproducing device 400 and the storage device 200. The data bus 410 electrically connects the components of the recording/reproducing device 400.

The recording/reproducing device 400 according to the present embodiment operates in the same way as with the recording device 100 and the reproducing device 300 according to the first embodiment. Specifically, the same can be said of the operation of the recording/reproducing device 400 according to the present embodiment as described in the first embodiment, replacing the controllers 101 and the 301 with the controller 401, replacing the storage interfaces 102 and 104 with the storage interface 402, and replacing the data buses 110 and 310 with the data bus 410.

While description has been made in the present embodiment regarding an arrangement in which the recording unit 403 and the reproducing unit 404 include the first encryption engine 103 and the second encryption engine 303, respectively, an arrangement may be made in which the recording unit 403 and the reproducing unit 404 share a single encryption engine having the functional blocks included in the encryption engines 103 and 303. With such a configuration, the single encryption engine has the same configuration as that of the encryption engine 203 of the storage device 200 shown in FIG. 7 according to the first embodiment.

Third Embodiment

Figure 13:
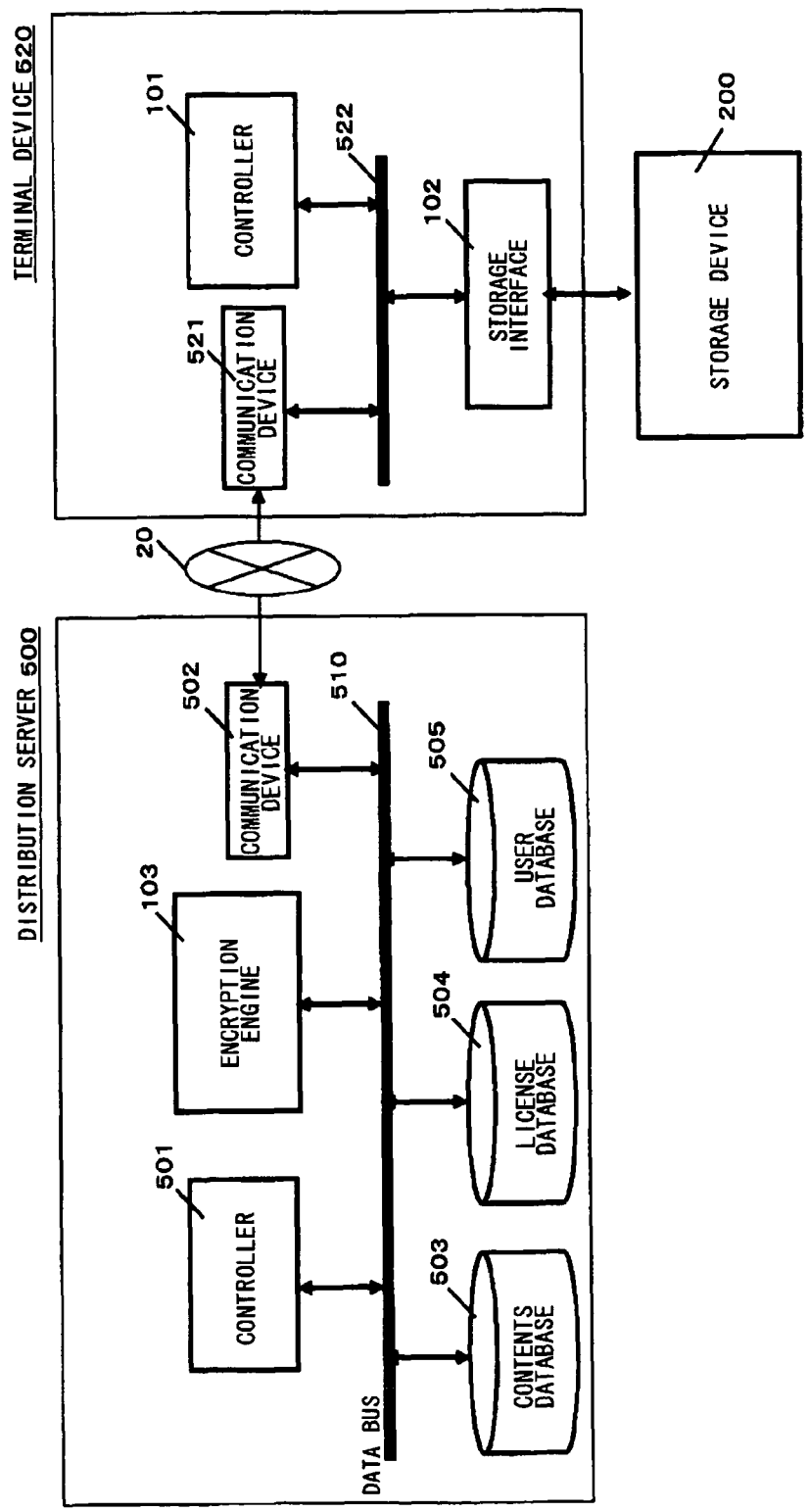
FIG. 13 is a diagram which shows an internal configuration of a contents distribution system according to a third embodiment.

FIG. 13 shows a configuration of contents distribution system according to a third embodiment. With the present embodiment, the recording device 100 according to the first embodiment is realized by a distribution server 500 for distributing contents and a terminal device 520 for receiving the contents thus provided. Note that in the drawing, the same components as those of the recording device 100 according to the first embodiment are denoted by the same reference numerals.

The distribution server 500 includes an encryption engine 103, a communication device 502, a contents database 503, a license database 504, a user database 505, a controller 501 for controlling these components, and a data bus 510 for electrically connecting these components. The terminal device 520 includes the controller 101, the storage interface 102, a communication device 521, and a data bus 522 for electrically connecting these components. The distribution server 500 and the terminal device 520 are connected to the Internet 20 which is an example of a network through the communication devices 502 and 521, respectively.

The encryption engine 103 of the distribution server 500 has the same functions as those of the encryption engine 103 according to the first embodiment. The controller 101 and the storage interface 102 of the terminal device 520 have the same functions as those of the controller 101 and the storage interface 102 according to the first embodiment, respectively.

The contents database 503 holds contents data which are to be provided to the user. The license database 504 holds license data containing a contents key for encrypting the contents data. With the present embodiment, the contents data is stored in the contents database 503 in the form of encrypted data which has been encrypted using the contents key. Also, an arrangement may be made in which the distribution server 500 further including the contents encoder 105 and the encryption device 104 reads out non-encrypted contents data from the contents database 503 storing the non-encrypted contents data, and encodes and encrypts the contents data thus read out, thereby creating encrypted contents data.

The user database 505 holds the user information regarding the user to which the contents are to be provided. For example, the user database 505 may hold the user private information, the address of the user terminal device 520, the purchase history regarding contents, fee information, and so forth. The controller 501 reads out encrypted contents from the contents database 503, and provides the encrypted contents thus read out, to the user, in response to the request from the user. Then, the controller 501 provides license data to the user, which allows the encryption engine 103 to decrypt the encrypted contents, following which the controller 501 updates the user database 505 for the contents fee of the contents providing service.

The contents distribution system according to the present embodiment has the same configuration as the system according to the first embodiment, replacing the data bus 510, the communication device 502, the Internet 20, the communication device 512, and the data bus 522, with the data bus 110 for electrically connecting the components included in the system. The contents distribution system according to the present embodiment performs encryption input/output processing following the same procedure as with the first embodiment.

With the present embodiment, the encryption engine 103 and the controller 101 communicate with each other via the Internet 20. With such a configuration, the encryption engine 103 and the controller 101 perform transmission/reception of data in the form of encrypted communication at all times as described above with reference to FIGS. 8 and 9. Thus, the communication is made with high tamper-resistant performance between the encryption engine 103 and the controller 101, even though via the Internet.

An arrangement may be made in which the storage device 200 is mounted to the reproducing device 300 according to the first embodiment, or the recording/reproducing device 400 according to the second embodiment, thereby allowing reproducing of the contents. Also, an arrangement may be made in which the terminal device 520 includes the reproducing unit 404 of the recording/reproducing device 400, thereby allowing reproducing of the contents.

As described above, description has been made regarding the present invention with reference to the aforementioned embodiments. The above-described embodiments have been described for exemplary purposes only, and are by no means intended to be interpreted restrictively. Rather, it can be readily conceived by those skilled in this art that various modifications may be made by making various combinations of the aforementioned components or the aforementioned processing, which are also encompassed in the technical scope of the present invention.

For example, while description has been made in the aforementioned embodiments regarding arrangements in which the encryption engine includes separate functional blocks of a functional block for encryption and a functional block for decryption, such functional blocks share the circuit on a component basis. This enables a reduced circuit scale, thereby reducing the size of the system and power consumption thereof.

With the present invention, various modifications may be made as appropriate within the scope of the technical idea of the present invention as laid forth in the appended claims.

What is claimed is:

1. A content usage right information providing device for providing content usage right information containing a content key for decrypting encrypted content data to a content usage right information receiving device, the content usage right information providing device comprising:
    a processor;
    a memory having a program, when executed, causing the processor to perform the following functions:
    an interface function for receiving from the content usage right information receiving device a first certificate containing a first public key;
    a verification function for verifying the first certificate;
    a certificate output function for outputting a second certificate containing a second public key of the content usage right information providing device; and
    a first encryption function for encrypting a first symmetric key by using the first public key contained in the first certificate, and concatenating the encrypted first symmetric key and the second certificate output from the certificate output function, wherein
    the interface function transmits the encrypted first symmetric key and the second certificate to the content usage right information receiving device and receives from the content usage right information receiving device a first encrypted second symmetric key which is encrypted by using the second public key contained in the second certificate and further encrypted by using the first symmetric key,
    the processor further performs the following functions:
        a first decryption function for decrypting the first encrypted second symmetric key by using the first symmetric key and acquiring a second encrypted second symmetric key which is encrypted by using the second public key; and
        a second decryption function for decrypting the second encrypted second symmetric key by using a private key corresponding to the second public key and acquiring a second symmetric key, and
    the interface function transmits the content usage right information containing the content key after the second decryption function acquires the second symmetric key.

2. The content usage right information providing device according to claim 1, wherein
    the first decryption function acquires a third public key of the content usage right information receiving device,
    the processor further performs the following functions:
        a second encryption function for encrypting a third symmetric key by using the third public key; and
        a third encryption function for encrypting the content usage right information by using the third symmetric key, and
    the interface function transmits the content usage right information which is encrypted by using the third symmetric key.

3. The content usage right information providing device according to claim 1, the processor further performs a content encryption function for encrypting the content data by using the content key, wherein
    the interface function transmits the encrypted content data to the content usage right information receiving device.

4. A content usage right information receiving device for receiving content usage right information containing a content key for decrypting encrypted content data from a content usage right information providing device, the content usage right information receiving device comprising:
- a processor;
- a memory having a program, when executed, causing the processor to perform the following functions:
- a certificate output function for outputting a first certificate containing a first public key of the content usage right information receiving device;
- an interface function for transmitting the first certificate to the content usage right information providing device and receiving from the content usage right information providing device a second certificate and an encrypted first symmetric key which is encrypted by using the first public key contained in the first certificate, the encrypted first symmetric key and the second certificate being concatenated;
- a verification function for verifying the second certificate;
- a first decryption function for decrypting the encrypted first symmetric key by using a first private key corresponding to the first public key and acquiring a first symmetric key;
- a first encryption function for encrypting a second symmetric key by using a second public key contained in the second certificate and creating a first encrypted second symmetric key; and
- a second encryption function for encrypting the first encrypted second symmetric key by using the first symmetric key and creating a second encrypted second symmetric key, wherein the interface function transmits the second encrypted second symmetric key to the content usage right information providing device, and the interface function receives the content usage right information containing the content key after the second symmetric key is shared between the content usage right information receiving device and content usage right information providing device.

5. The content usage right information receiving device according to claim 4, wherein
- the second encryption function concatenates the first encrypted second symmetric key and a third public key of the content usage right information receiving device,
- the interface function receives an encrypted third symmetric key encrypted by using a third public key from the content usage right information providing device,
- the processor further performs a second decryption function for decrypting the encrypted third symmetric key by using a second private key corresponding to the third public key and acquiring the third symmetric key, and
- the interface function receives the content usage right information which is encrypted by using the third symmetric key.

6. The content usage right information receiving device according to claim 4, wherein the interface function receives the encrypted content data from the content usage right information providing device.

* * * * *